US007089580B1

(12) United States Patent
Vogel et al.

(10) Patent No.: US 7,089,580 B1
(45) Date of Patent: Aug. 8, 2006

(54) METHOD FOR IMPROVED CABLE MODEM RANGING IN A DATA-OVER-CABLE SYSTEM

(75) Inventors: Mark O. Vogel, Hampshire, IL (US); Philip T. Robinson, Lake Barrington, IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/538,342

(22) Filed: Mar. 29, 2000

(51) Int. Cl.
*H04N 7/173* (2006.01)

(52) U.S. Cl. .................. 725/111; 725/119; 725/127

(58) Field of Classification Search .............. 725/111, 725/119, 127, 133; 375/222
See application file for complete search history.

(56) References Cited

U.S. PATENT DOCUMENTS

| | | | |
|---|---|---|---|
| 4,644,533 A | 2/1987 | Braff et al. .................... 370/94 |
| 4,881,263 A | 11/1989 | Herbison et al. .............. 380/21 |
| 4,996,685 A | 2/1991 | Farese et al. ............... 370/58.1 |
| 5,014,234 A | 5/1991 | Edwards, Jr. ................ 364/900 |
| 5,138,712 A | 8/1992 | Corbin ........................ 395/700 |
| 5,301,273 A | 4/1994 | Konishi ........................ 395/200 |
| 5,347,304 A | 9/1994 | Moura et al. .................. 348/12 |
| 5,430,727 A | 7/1995 | Callon ....................... 370/85.13 |
| 5,442,749 A | 8/1995 | Northcutt et al. ....... 395/200.09 |
| 5,487,180 A | 1/1996 | Ohtake ....................... 455/54.1 |
| 5,488,412 A | 1/1996 | Majeti et al. .................. 348/10 |
| 5,489,897 A | 2/1996 | Inoue ..................... 340/870.39 |
| 5,528,595 A | 6/1996 | Walsh et al. .............. 370/85.13 |
| 5,583,931 A | 12/1996 | Schneider et al. ........... 379/399 |
| 5,586,121 A | 12/1996 | Moura et al. ................. 370/404 |
| 5,598,410 A | 1/1997 | Stone .......................... 370/469 |
| 5,600,717 A | 2/1997 | Schneider et al. ........... 379/399 |
| 5,606,606 A | 2/1997 | Schneider et al. ........... 379/399 |
| 5,608,446 A | 3/1997 | Carr et al. ....................... 348/6 |
| 5,610,910 A | 3/1997 | Focsaneanu et al. ........ 370/351 |
| 5,623,542 A | 4/1997 | Schneider et al. ........... 379/399 |

(Continued)

FOREIGN PATENT DOCUMENTS

WO    WO 200067385 A1  *  11/2000

OTHER PUBLICATIONS

"Radio Frequency Interface Specification (Interim Specification) SP-RFI-I04-980724", MCNS Holdings, L.P., 1997, pp. ii to 196.

(Continued)

*Primary Examiner*—Scott Beliveau
(74) *Attorney, Agent, or Firm*—McDonnell Boehnen Hulbert & Berghoff

(57) ABSTRACT

Methods for improved cable modem ranging in a data-over-cable system. One method includes receiving a value that characterizes how equipment in the network is configured. Using this characteristic value, a cable modem may estimate loss in its upstream path from a measurement of a downstream signal and thereby estimate its initial transmit level during ranging. Launching at a proper initial transmit level may ensure that range request messages arrive at the cable modem termination system with sufficient strength to be detected and hence ameliorate ranging. Another method collects difference between these estimated initial transmit levels and the final transmit levels that succeeded in evoking a response from the cable modem termination system. The collected differences are analyzed and the result of the analysis is passed to cable modems to adjust their estimated initial transmit levels. These methods may shorten a cable modem's time for ranging and may decrease collisions on the upstream path when many cable modems try to range simultaneously.

32 Claims, 11 Drawing Sheets

U.S. PATENT DOCUMENTS

| | | | |
|---|---|---|---|
| 5,623,601 A | 4/1997 | Vu | 395/187.01 |
| 5,636,211 A | 6/1997 | Newlin et al. | 370/465 |
| 5,675,732 A | 10/1997 | Majeti et al. | 395/200.01 |
| 5,675,742 A | 10/1997 | Jain et al. | 395/200 |
| 5,708,654 A | 1/1998 | Arndt et al. | 370/242 |
| 5,710,885 A | 1/1998 | Bondi | 395/200.54 |
| 5,724,510 A | 3/1998 | Arndt et al. | 395/200.5 |
| 5,761,602 A | 6/1998 | Wagner et al. | 455/3.1 |
| 5,778,181 A | 7/1998 | Hidary et al. | 395/200.48 |
| 5,784,597 A * | 7/1998 | Chiu et al. | 713/401 |
| 5,790,198 A | 8/1998 | Roop et al. | 348/460 |
| 5,790,548 A | 8/1998 | Sistanizadeh et al. | 370/401 |
| 5,790,677 A | 8/1998 | Fox et al. | 380/24 |
| 5,790,770 A | 8/1998 | McClure et al. | 395/200.61 |
| 5,790,806 A | 8/1998 | Koperda | 395/200.82 |
| 5,793,747 A | 8/1998 | Kline | 370/230 |
| 5,799,086 A | 8/1998 | Sudia | 380/23 |
| 5,805,804 A | 9/1998 | Laursen et al. | 395/200.02 |
| 5,809,252 A | 9/1998 | Beighe et al. | 395/200.57 |
| 5,812,819 A | 9/1998 | Rodwin et al. | 395/500 |
| 5,815,664 A | 9/1998 | Asano | 395/200.57 |
| 5,818,845 A | 10/1998 | Moura et al. | 370/449 |
| 5,819,028 A | 10/1998 | Manghirmalani et al. | 395/185.1 |
| 5,819,042 A | 10/1998 | Hansen | 395/200.52 |
| 5,828,655 A | 10/1998 | Moura et al. | 370/236 |
| 5,828,666 A | 10/1998 | Focsaneanu et al. | 370/389 |
| 5,835,720 A | 11/1998 | Nelson et al. | 395/200.54 |
| 5,835,727 A | 11/1998 | Wong et al. | 395/200.68 |
| 5,841,777 A | 11/1998 | Cohen | 370/433 |
| 5,852,721 A | 12/1998 | Dillon et al. | 395/200.47 |
| 5,854,901 A | 12/1998 | Cole et al. | 709/245 |
| 5,859,852 A | 1/1999 | Moura et al. | 370/449 |
| 5,864,679 A | 1/1999 | Kanai et al. | 709/238 |
| 5,870,134 A | 2/1999 | Laubach et al. | 348/12 |
| 5,872,523 A | 2/1999 | Dellaverson et al. | 340/825.52 |
| 5,884,024 A | 3/1999 | Lim et al. | 395/187.01 |
| 5,894,479 A | 4/1999 | Mohammed | 370/401 |
| 5,903,558 A | 5/1999 | Jones et al. | 370/351 |
| 5,909,549 A | 6/1999 | Compliment et al. | 709/223 |
| 5,913,037 A | 6/1999 | Spofford et al. | 395/200.56 |
| 5,915,119 A | 6/1999 | Cone | 395/750.02 |
| 5,922,049 A | 7/1999 | Radia et al. | 709/220 |
| 5,922,051 A | 7/1999 | Sidey | 709/223 |
| 5,923,659 A | 7/1999 | Curry et al. | 370/401 |
| 5,926,458 A | 7/1999 | Yin | 370/230 |
| 5,929,850 A | 7/1999 | Broadwin et al. | 345/327 |
| 5,941,988 A | 8/1999 | Bhagwat et al. | 713/201 |
| 5,943,604 A | 8/1999 | Chen et al. | 455/5.1 |
| 5,954,797 A | 9/1999 | Sidey | 709/223 |
| 5,958,007 A | 9/1999 | Lee et al. | 709/219 |
| 5,960,177 A | 9/1999 | Tanno | 395/200.59 |
| 5,974,453 A | 10/1999 | Anderson et al. | 709/220 |
| 5,982,748 A | 11/1999 | Yin et al. | 370/232 |
| 5,987,524 A | 11/1999 | Yoshida et al. | 709/245 |
| 5,991,292 A | 11/1999 | Focsaneanu et al. | 370/352 |
| 5,991,306 A | 11/1999 | Burns et al. | 370/429 |
| 5,996,076 A | 11/1999 | Rowney et al. | 713/201 |
| 5,999,536 A | 12/1999 | Kawafuji et al. | 370/401 |
| 6,003,077 A | 12/1999 | Bawden et al. | 709/223 |
| 6,005,851 A | 12/1999 | Craddock et al. | 370/329 |
| 6,006,264 A | 12/1999 | Colby et al. | 709/226 |
| 6,009,103 A | 12/1999 | Woundy | 370/410 |
| 6,012,088 A | 1/2000 | Li et al. | 709/219 |
| 6,013,107 A | 1/2000 | Blackshear et al. | 703/229 |
| 6,014,545 A | 1/2000 | Wu et al. | 455/3.1 |
| 6,018,767 A | 1/2000 | Fijolek et al. | 709/218 |
| 6,031,841 A | 2/2000 | Woundy | 370/410 |
| 6,032,019 A | 2/2000 | Chen et al. | 455/5.1 |
| 6,041,041 A | 3/2000 | Ramanathan et al. | 370/241 |
| 6,046,979 A | 4/2000 | Bauman | 370/229 |
| 6,049,546 A | 4/2000 | Ramakrishnan | 370/412 |
| 6,049,825 A | 4/2000 | Yamamoto | 709/221 |
| 6,049,826 A | 4/2000 | Beser | 709/222 |
| 6,052,724 A | 4/2000 | Willie et al. | 709/223 |
| 6,058,421 A | 5/2000 | Fijolek et al. | 709/225 |
| 6,061,349 A | 5/2000 | Coile et al. | 370/389 |
| 6,064,372 A | 5/2000 | Kahkoska | 345/173 |
| 6,065,049 A | 5/2000 | Beser | 709/218 |
| 6,070,187 A | 5/2000 | Subramaniam et al. | 709/220 |
| 6,070,242 A | 5/2000 | Wong et al. | 713/201 |
| 6,070,246 A | 5/2000 | Beser | 713/201 |
| 6,073,178 A | 6/2000 | Wong et al. | 709/229 |
| 6,075,787 A | 6/2000 | Bobeck et al. | 370/395 |
| 6,091,709 A | 7/2000 | Harrison et al. | 370/235 |
| 6,094,431 A | 7/2000 | Yamato et al. | 370/395 |
| 6,104,700 A | 8/2000 | Haddock et al. | 370/235 |
| 6,111,887 A * | 8/2000 | Daily et al. | 370/449 |
| 6,112,258 A | 8/2000 | Miller et al. | 710/19 |
| 6,122,254 A | 9/2000 | Aydemir et al. | 370/235 |
| 6,128,298 A | 10/2000 | Wootton et al. | 370/392 |
| 6,130,879 A | 10/2000 | Liu | 370/230 |
| 6,130,880 A | 10/2000 | Naudus et al. | 370/235 |
| 6,137,792 A | 10/2000 | Jonas et al. | 370/354 |
| 6,137,793 A | 10/2000 | Gorman et al. | 370/360 |
| 6,148,410 A | 11/2000 | Baskey et al. | 714/4 |
| 6,157,965 A | 12/2000 | Mohammed et al. | 710/8 |
| 6,170,061 B1 | 1/2001 | Beser | 713/201 |
| 6,178,455 B1 | 1/2001 | Schutte et al. | 709/228 |
| 6,185,624 B1 | 2/2001 | Fijolek et al. | 709/239 |
| 6,189,102 B1 | 2/2001 | Beser | 713/201 |
| 6,208,656 B1 | 3/2001 | Hrastar et al. | 370/401 |
| 6,212,563 B1 | 4/2001 | Beser | 709/227 |
| 6,216,171 B1 | 4/2001 | Isono et al. | 709/250 |
| 6,223,222 B1 | 4/2001 | Fijolek et al. | 709/227 |
| 6,240,464 B1 | 5/2001 | Fijolek et al. | 709/250 |
| 6,243,369 B1 * | 6/2001 | Grimwood et al. | 370/335 |
| 6,260,072 B1 | 7/2001 | Rodriguez-Moral | 709/241 |
| 6,269,099 B1 | 7/2001 | Borella et al. | 370/389 |
| 6,272,150 B1 | 8/2001 | Hrastar | 370/486 |
| 6,275,853 B1 | 8/2001 | Beser et al. | 709/223 |
| 6,289,377 B1 | 9/2001 | Lalwaney et al. | 709/222 |
| 6,295,554 B1 | 9/2001 | Karadogan et al. | 709/219 |
| 6,301,223 B1 | 10/2001 | Hrastar et al. | 370/227 |
| 6,301,618 B1 | 10/2001 | Sitaraman et al. | 709/227 |
| 6,308,328 B1 | 10/2001 | Bowcutt et al. | 725/111 |
| 6,331,987 B1 | 12/2001 | Beser | 370/486 |
| 6,332,163 B1 | 12/2001 | Bowman-Amuah | 709/231 |
| 6,337,858 B1 | 1/2002 | Petty et al. | 370/356 |
| 6,351,773 B1 | 2/2002 | Fijolek et al. | 709/228 |
| 6,370,147 B1 | 4/2002 | Beser | 370/401 |
| 6,393,478 B1 | 5/2002 | Bahlmann | 709/224 |
| 6,442,158 B1 | 8/2002 | Beser | 370/352 |
| 6,445,930 B1 * | 9/2002 | Bartelme et al. | 455/522 |
| 6,449,291 B1 * | 9/2002 | Burns et al. | 370/516 |
| 6,453,472 B1 * | 9/2002 | Leano et al. | 725/111 |
| 6,490,727 B1 * | 12/2002 | Nazarathy et al. | 725/129 |
| 6,510,162 B1 | 1/2003 | Fijolek et al. | 370/432 |
| 6,574,797 B1 | 6/2003 | Naegeli et al. | 725/120 |
| 6,594,305 B1 * | 7/2003 | Roeck et al. | 375/222 |
| 6,594,467 B1 * | 7/2003 | Asia et al. | 455/3.03 |
| 2002/0122050 A1 | 9/2002 | Sandberg | 345/705 |
| 2002/0136165 A1 | 9/2002 | Ady et al. | 370/241 |
| 2003/0028891 A1 | 2/2003 | Hardt et al. | 725/107 |

OTHER PUBLICATIONS

Droms, R., *Dynamic Host Configuration Protocol*, Request for Comments 1541, Oct. 1993, pp. 1 to 31.

RFC 791, *Internet Protocol, DARPA Internet Program Protocol Specification*, Sep. 1981, pp. 1-37.

Postel, J., *Internet Protocol, DARPA Internet Program Protocol Specification*, RFC 792, Sep. 1981, pp. 1-14.

Postel, J., *User Datagram Protocol*, RFC 768, Aug. 28, 1980, pp. 1-3.

RFC 793, *Transmission Control Protocol, DARPA Internet Program Protocol Specification*, Sep. 1981, pp. 1-68.

Case, J. et al., *A Simple Network Management Protocol (SNMP)*, RFC 1157, May 1990, pp. 1-26.

Sollins, K., *The TFTP Protocol (Revision 2)*, RFC 1350, Jul. 1992, pp. 1-9.

Alexander, S., *DHCP Options and BOOTP Vendor Extensions*, RFC 2132, Mar. 1997, pp. 1-37.

"Radio Frequency Interface Specification (Interim Specification) SP-RFIv1.1-I03-991105", MCNS Holdings, L.P., 1999, pp. Ii to 366.

"Radio Frequency Interface Specification (Interim Specification) SP-RFI-I05-991105", MCNS Holdings, L.P., 1999, pp. ii to 202.

"Radio Frequency Interface Specification (Interim Specification) SP-RFIv1.1-I06-001215", MCNS Holdings, L.P., 2000, pp. ii to 432.

Kyees et al., "ADSL: A New Twisted-Pair Access To The Information Highway", IEEE Communication Magazine, vol. 33, Issue 4, Apr. 1995, pp. 52-60.

Huang et al., "Design Of An MPEG-Based Set-Top Box For Video On Demand Services, Acoustics, Speech, And Signal Processing", 1995 International Conference, ICASSP-95, vol. 4, ISBN:0-7803-2431-5, May 9-12, 1995, pp. 2655-2658.

"A Solution For The Priority Queue Problem Of Deadline-Ordered Service Disciplines", N.R. Figueira, IEEE International Conference On Computer Communications And Networks, Sep. 22-25, 1997, pp. 320-325.

"Baseline Privacy Interface Specification (Interim) SP-BPI-I01-970922", MCNS Holdings, L.P., 1997, pp. ii to 65.

"Security System Specification (Interim Specification) SP-SSI-I01-970506", MCNS Holdings, L.P., 1997, pp. ii to 103.

"Cable Modem to Customer Premise Equipment Interface Specification (Interim) SP-CMCI-I02-980317", Multimedia Cable Network Systems (MCNS) Holdings, L.P., Cable Television Laboratories, Inc., 1998, pp. ii to 40.

"Operations Support System Interface Specification Baseline Privacy Interface MIB (Interim Specification) SP-OSSI-BPI-I01-980331", MCNS Holdings, L.P., 1997 and 1998, pp. ii to 33.

"Cable Modem Termination System-Network Side Interface Specification (Interim Specification) SP- CMTS-NSII01-960702", MCNS Holdings, L.P., 1996, pp. ii to 13.

"Removable Security Module Interface Specification (Interim Specification) SP-RSMI-I01-980204", MCNS Holdings, L.P., Cable Television Laboratories, Inc., 1997, pp. ii to 47.

"Operations Support System Interface Specification (Interim) SP-OSSII01-970403", MCNS Holdings, L.P., 1997, pp. 1 to 30.

"Radio Frequency Interface Specification (Interim Specification) SP-RFI-I02-971008", MCNS Holdings, L.P., 1997, pp. ii to 186.

"Cable Modem Telephony Return Interface Specification (Interim) SP-CMTRI-I01-970804", MCNS Holdings, L.P., Cable Television Laboratories, Inc., 1997, pp. ii to 73.

"Dynamic Host Configuration Protocol (DHCP)", Request for Comments 2131, Internet Engineering Task Force, Mar. 1997, pp. 1 to 42.

"IPCDN Telephony Return MIB", IPCDN Working Group, Internet Engineering Task Force, Mar. 1998, pp. 1 to 26.

* cited by examiner

FIG. 5

MAP INFORMATION ELEMENTS — 100

| | | | |
|---|---|---|---|
| FIRST INTERVAL | SID <u>76</u> | IUC <u>102</u> | OFFSET <u>104</u> |
| SECOND INTERVAL | SID | IUC | OFFSET |
| ⁓ | | | ⁓ |
| LAST INTERVAL | SID | IUC | OFFSET |

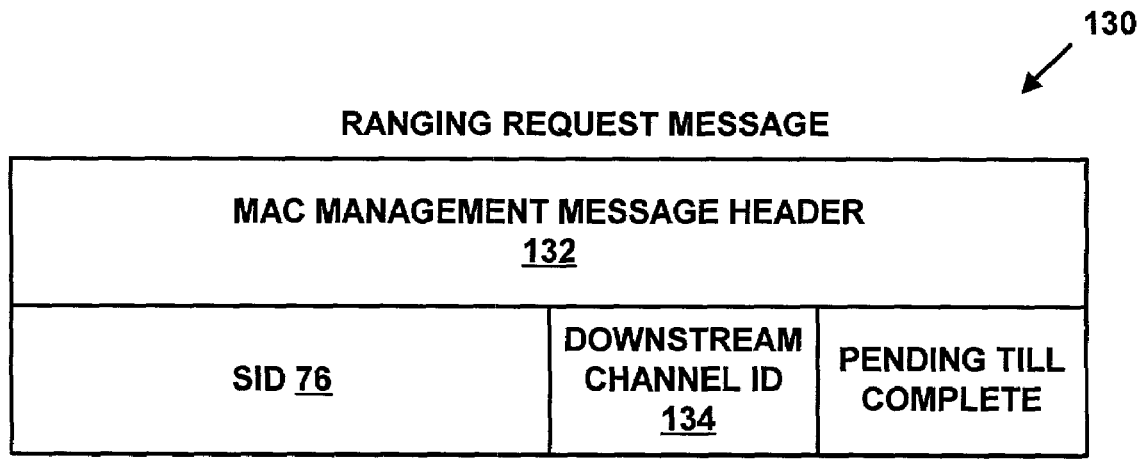
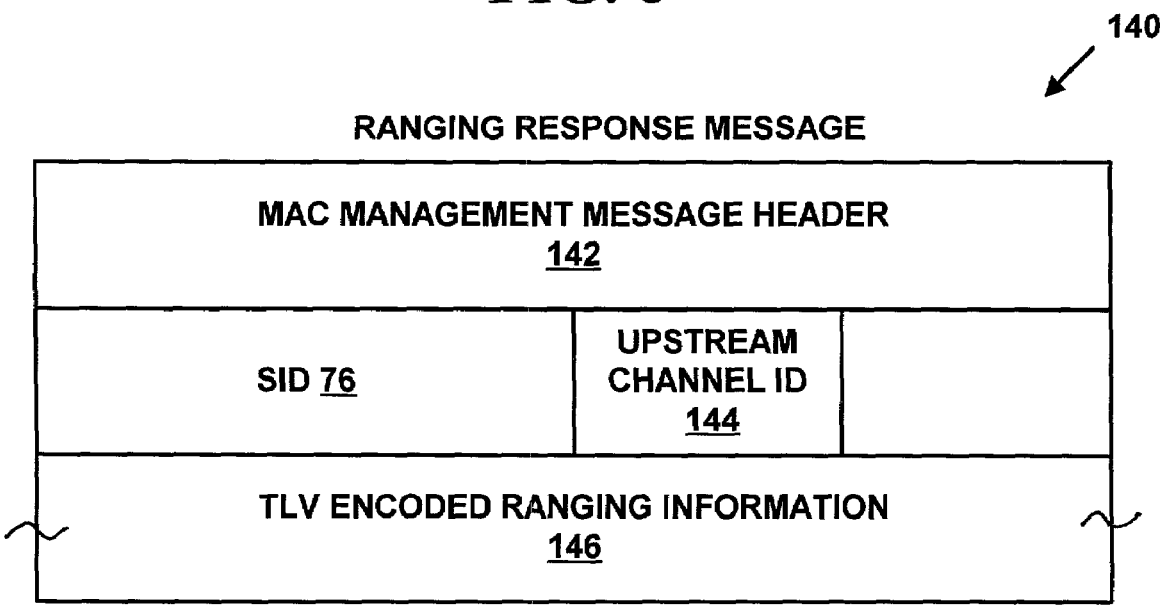

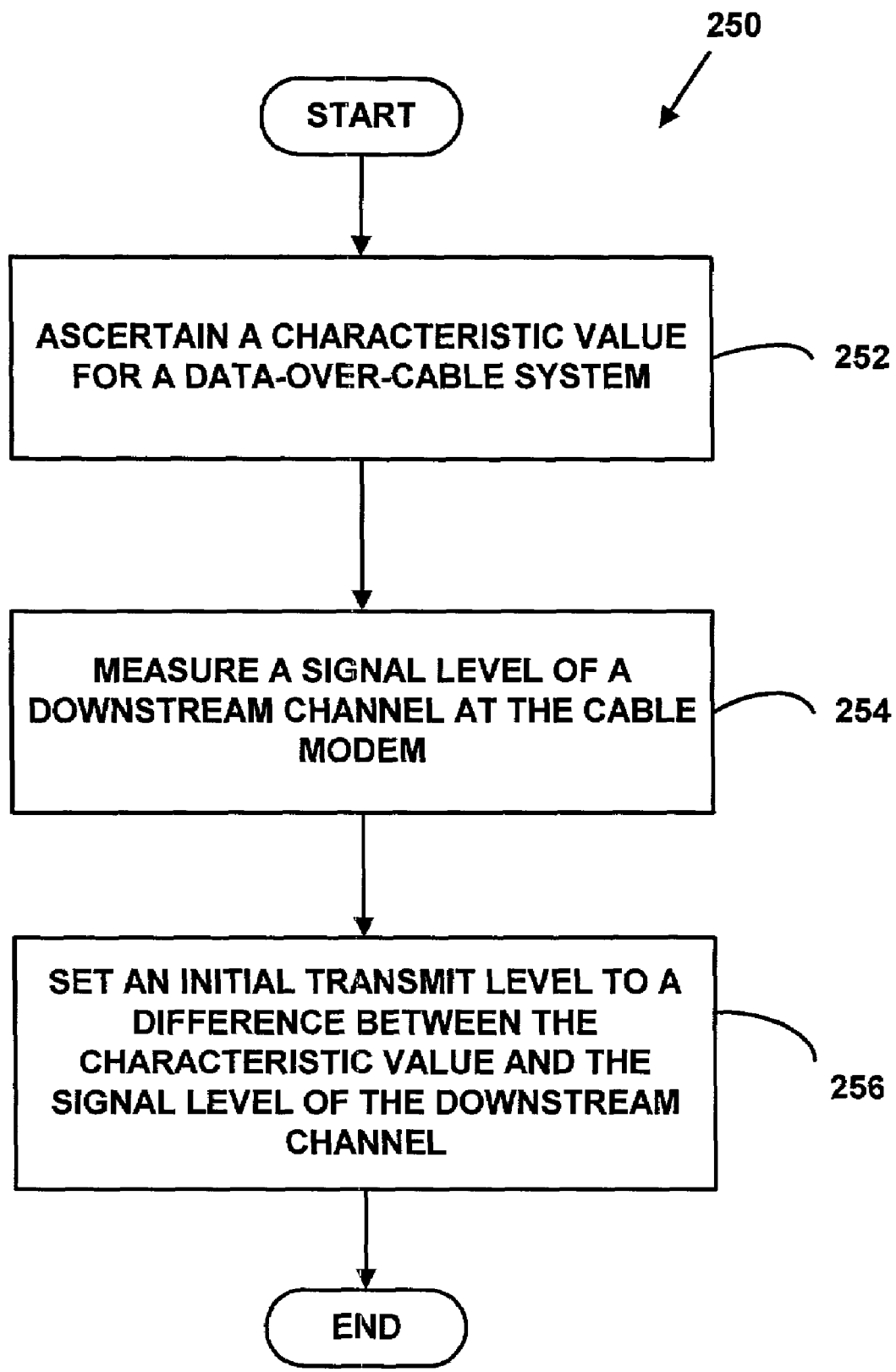

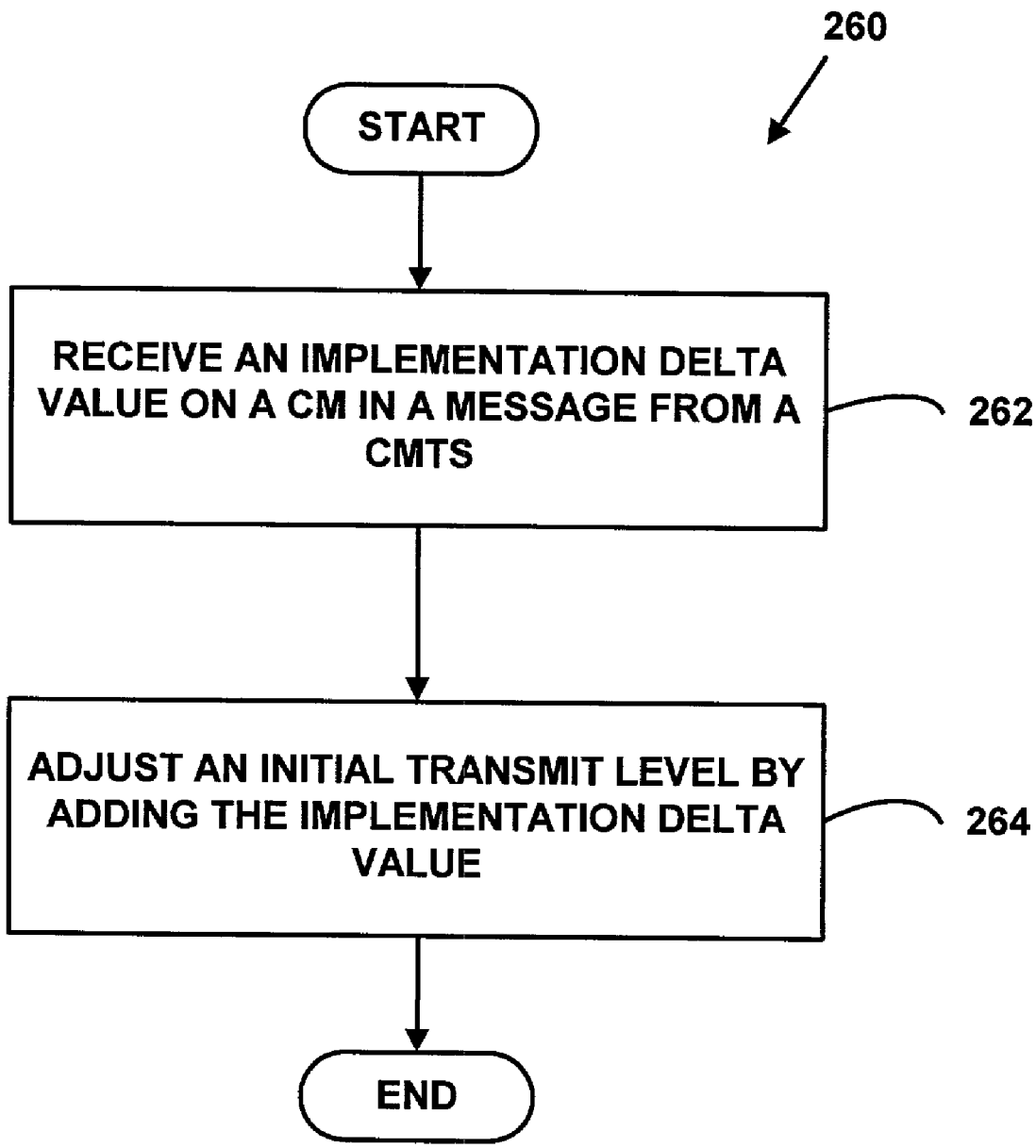

METHOD FOR IMPROVED CABLE MODEM RANGING IN A DATA-OVER-CABLE SYSTEM

FIELD OF INVENTION

The present invention relates to communications over a network. More specifically, it relates to a method for improving cable modem ranging in an initial maintenance region in a data-over-cable system.

BACKGROUND OF THE INVENTION

With the explosive growth of the Internet, many customers have desired to use the larger bandwidth of a cable television network to connect to the Internet and other computer networks. Cable modems, such as those provided by 3Com Corporation of Santa Clara, Calif., and others offer customers higher-speed connectivity to the Internet, an intranet, local area networks ("LANs") and other computer networks via cable television networks. These cable modems currently support a data connection to the Internet and other computer networks via a cable television network with a data rate of up to 30+ Mbps which is a much larger data rate than can be supported by a modem used over a standard telephone line.

When a cable modem is connected to a data-over-cable system, it must first gain access to the system by undergoing an initialization procedure before it is permitted to transmit data. A part of the initialization procedure includes a ranging process to determine the appropriate transmission parameters for its data transfer. This process involves sending a ranging message at an appropriate time interval, referred to as initial maintenance interval. Because the cable modem does not know beforehand the loss between it and a cable modem termination system ("CMTS"), the cable modem initially transmits at a minimum specified level and then increases the level throughout the ranging process. The ranging process is performed so that the cable modem does not transmit at levels that can overdrive station equipment and cause impairments to other channels. After transmitting the ranging message, the cable modem awaits an acknowledgement from the CMTS. If the cable modem receives no acknowledgement from the CMTS, the cable modem raises its power level and transmits a ranging message again. This process is repeated until the modem receives an acknowledgement from the CMTS, at which time the cable modem moves into the next phase of ranging, known as station maintenance.

A typical cable modem, however, has no prior network knowledge of the data-over-cable system when the initial ranging process is performed. The cable modem is, therefore, typically unable to select the proper transmit level on the first attempt. It may in fact take many attempts to select the proper transmit level if the required transmit level is sufficiently high or the increments for increasing the power level are small. In addition, since initial maintenance intervals are contention regions, i.e. multiple modems can attempt ranging within the interval, cable modem ranging messages may collide and be ignored by the CMTS, resulting in multiple attempts at transmission at a given power level before the CMTS receives a ranging message. These factors can lead to long ranging times, especially when there are many cable modems attempting to range.

It is, therefore, desirable to improve the ranging phase of a cable modem, by reducing the time for the cable modem to range.

SUMMARY OF THE INVENTION

One aspect of the invention is a method for estimating an initial transmit level for a cable modem to range on an upstream channel of a data-over-cable system. The upstream channel carries data transmissions from a plurality of cable modems to a cable modem termination system. The method includes ascertaining a characteristic value for the data-over-cable system. The characteristic value is associated with configuration parameters for the data-over-cable system. A signal level of a downstream channel is measured on the cable modem. The downstream channel carries data transmissions from the cable modem termination system to the plurality of cable modems. The initial transmit level is set to a difference between the characteristic value and the signal level of the downstream channel.

Another aspect of the invention is a method for adjusting an initial transmit level for a cable modem to range on an upstream channel. The method includes receiving an implementation delta value on the cable modem in a message from a cable modem termination system. The implementation delta value represents a dynamic correction to the initial transmit level, the delta valve being responsive to changes in the data-over-cable network. The initial transmit level is adjusted by adding the implementation delta value to the initial transmit level.

BRIEF DESCRIPTION OF THE DRAWINGS

The foregoing and other features and advantages of preferred embodiments of the present invention will be more readily apparent from the following detailed description, which proceeds with references to the accompanying drawings:

FIG. 5 is a block diagram illustrating the structure of MAP Information Elements that may appear in the MAP message of FIG. 4;

FIG. 7 is a block diagram illustrating the structure of a RNG-REQ message that may be transmitted by a cable modem in the cable modem system of FIG. 1;

FIG. 8 is a block diagram illustrating the structure of a RNG-RSP message transmitted by a CMTS in the cable modem system of FIG. 1;

FIG. 11 is a flow diagram illustrating a method for estimating an initial transmit level; and FIG. 12 is a flow diagram illustrating a method for adjusting an initial transmit level.

DETAILED DESCRIPTION OF PREFERRED EMBODIMENTS

Cable television networks such as those provided by Comcast Cable Communications, Inc., of Philadelphia, Pa., Cox Communications of Atlanta, Ga., Tele-Communications, Inc., of Englewood, Colo., Time-Warner Cable, of Marietta, Ga., Continental Cablevision, Inc., of Boston, Mass., and others provide cable television service to a large number of subscribers over a large geographical area. The cable television networks typically are interconnected by cables such as coaxial cables or a Hybrid Fiber/Coaxial ("HFC") cable system. The system can also provide data services having data rates from about 10 Mega-bits-per-second ("Mbps") to 30+ Mbps per channel.

The Internet, a world wide network of interconnected computers, provides multi-media content including audio, video, graphics and text that may be best experienced, whether viewing or downloading, using a large bandwidth. Most Internet Service Providers ("ISPs") allow customers to connect to the Internet via a serial telephone line from a public switched telephone network at data rates including 14,400 bps, 28,800 bps, 33,600 bps, 56,000 bps and others that are much slower than the about 10 Mbps to 30+ Mbps available on a coaxial cable or HFC cable system on a cable television network.

Background information related to cable modem systems in general is described in the Data-Over-Cable Service Interface Specifications ("DOCSIS")—Radio Frequency Interface Specifications, Interim Draft, dated Jul. 24, 1998, issued by Cable Television Laboratories, Inc. This document, known to persons working in the art, is incorporated by reference herein.

Figure 1:
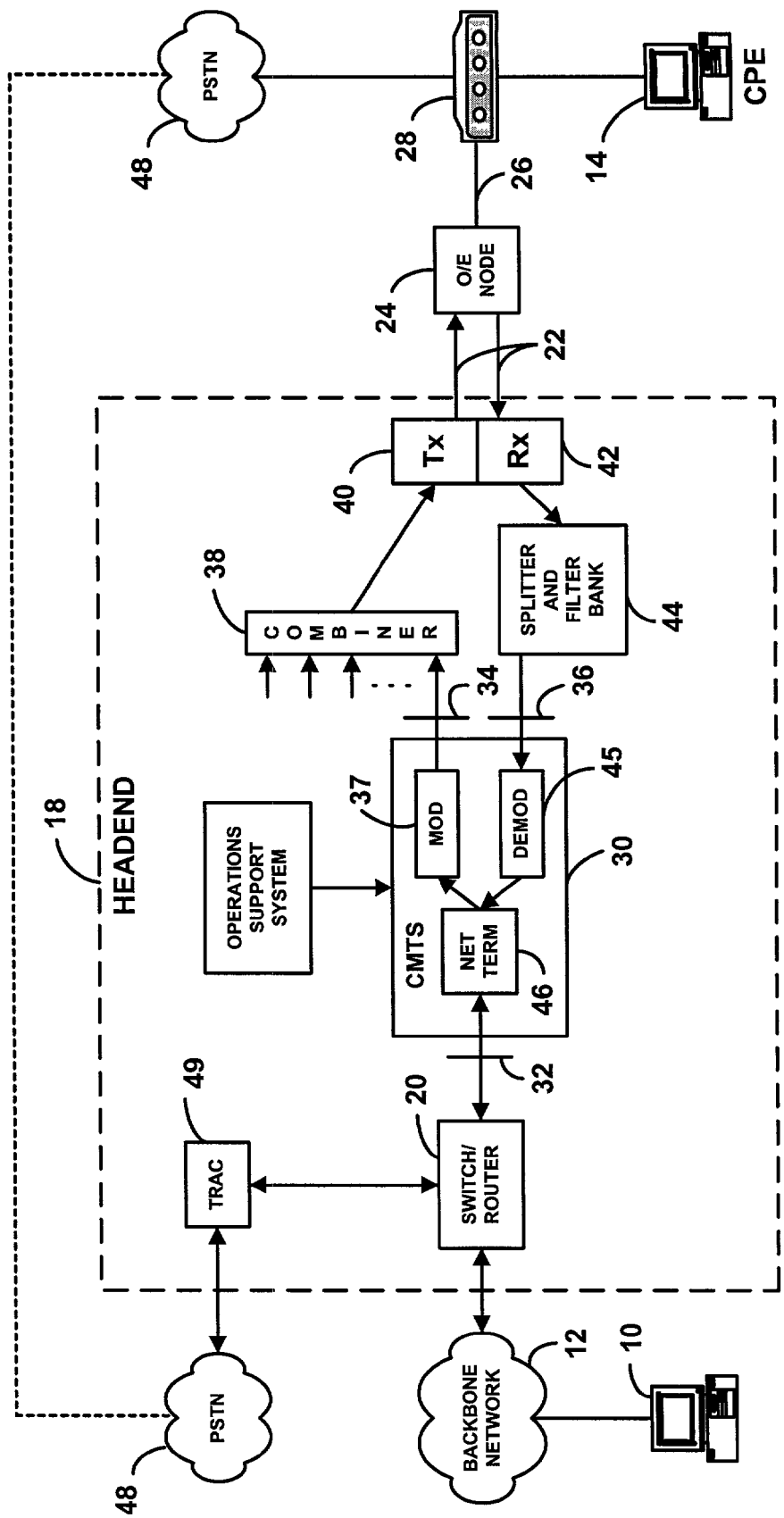
FIG. 1 is a block diagram illustrating a basic architecture for a data-over-cable system.

The basic overall architecture of a data-over-cable system is shown in FIG. 1. The system of FIG. 1 provides a mechanism by which a computer 10 connected, either directly or indirectly by intermediate networks, to a backbone network 12, may communicate with another computer 14 via a data-over-cable infrastructure indicated generally by reference numeral 16. The cable television infrastructure 16 includes a distribution hub or "head-end" 18 that is connected to the backbone network 12 via a switch or router 20. A cable system head-end 18 is a central location in the cable television network that is responsible for sending cable signals in the downstream direction as defined below. The head-end 18 modulates digital data from the backbone network 12 into analog form and supplies the analog signals to a fiber network 22, which is connected to a plurality of optical/electronic ("O/E") nodes 24. The O/E nodes 24 convert optical signals in the fiber network 22 to electrical signals for transmission over a coax cable network 26 to a cable modem 28 at the customer's location. The cable modem ("CM") 28 demodulates the analog signals, extracts the digital data, and supplies the data to the customer premise equipment ("CPE") 14, which, in a typical situation, is a general purpose computer in a home environment but may alternatively be a multimedia display device or a point-of-sale terminal in a store.

The head-end 18 includes a cable modem termination system ("CMTS") 30. This device provides a network side interface to a wide area network, indicated at 32, and a radio frequency ("RF") interface between the CMTS 30 and the cable network in both the downstream and upstream directions, indicated respectively at 34 and 36. The term "downstream", as used in the present document, refers to transmission in the direction from the head-end 18 or CMTS 30 to the cable modem 28 at the customer premises. The term "upstream" refers to transmission in the direction from the cable modem 28 at the customer premises to the CMTS 30.

For transmission in the downstream direction, the CMTS 30 supplies data received from the computer 10 through the network 12 to a modulation circuit ("MOD") 37 and then to a combiner 38, where the data is combined with video signals for the cable television system. The combined signals are sent to a transmission module 40 where they are imparted onto the fiber network 22.

In a typical two-way cable system, also termed a bi-directional cable system, a cable modem 28 will transmit data packets to the CMTS 30 over one or more upstream channels on the cable television network 22 and 26. In the upstream direction, data from the CPE 14 is transmitted from the cable modem 28 over the cable network 26 and 22 and received at a receiver module 42. The receiver module 42 couples the upstream signal to a splitter and filter bank 44 which separates the data signal from video signals for the cable television system and couples the data signal to a demodulation circuit 45 ("DEMOD") as in the CMTS 30. The data is processed by a network termination unit 46, sent to the switch or router 20 and routed onto the network 12 for transmission to the remote computer 10.

A data packet may carry, as its payload, information that is sent from the CPE 14 and destined for the CMTS 30. The cable modem 28 adds overhead to the data packet to maintain the integrity of the payload. Examples of overhead include redundant bits for error correction and preambles. On the cable network 22 and 26 side of the cable modem 28, the data packet and overhead are transmitted from and received by the cable modem 28 in the form of digitally modulated radio frequency carriers. An exemplary bi-directional data-over-cable system includes customer premises equipment 14 (e.g., a customer computer), a cable modem 28, a CMTS 30, a cable television network 18, 22, 26, and a backbone data network 12 (e.g., the Internet).

However, some cable television networks provide only uni-directional cable systems, supporting only the "downstream" cable data path. A return data path via a telephone network, which may be referred to as a "telephony return", such as a public switched telephone network provided by AT&T, GTE, Sprint, MCI and others, may be used for the "upstream" data path. A cable television system with an upstream connection to a telephony network may be referred to as a "data-over-cable system with telephony return." Such a return system is indicated in FIG. 1 where the cable modem 28 is also shown connected to the public switched telephone network ("PSTN") 48 which is in turn connected to the backbone network 12 as indicated by the dashed line. An exemplary data-over-cable system with telephony return includes customer premises equipment 14, a cable modem 28, a CMTS 30, a cable television network 18, 22, 26, a public switched telephone network 48, a telephony remote access concentrator ("TRAC") 49 and a backbone data network 12. The CMTS 30 and the telephony remote access concentrator 49 together may be referred to as a "telephony return termination system."

The preferred embodiments may be utilized with either a bi-directional cable system or a data-over-cable system wit telephony return. Cable modems and cable modem termination systems include those provided by 3Com Corporation of Santa Clara, Calif., Motorola Corporation of Schamburg, Ill., Hewlett-Packard Co. of Palo Alto, Calif., Bay Networks of Santa Clara, Calif., Scientific-Atlanta of Norcross, Ga., General Instruments of Horsham, Pa., and others.

Cable Modem Protocol Stack

Figure 2:
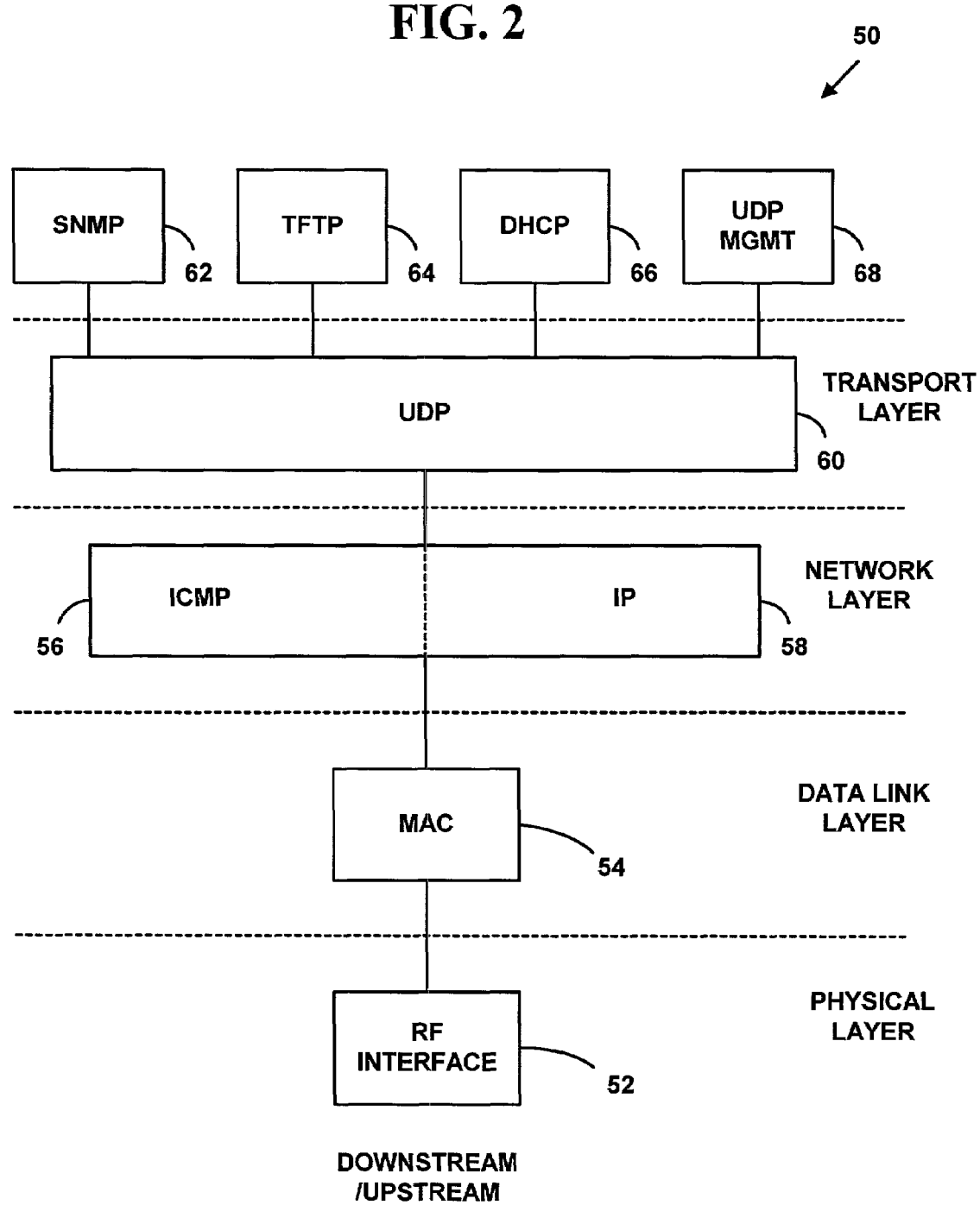
FIG. 2 is a block diagram illustrating a protocol stack for a cable modem in the cable modem system depicted in FIG. 1.

FIG. 2 is a block diagram illustrating a protocol stack 50 for the cable modem 28. FIG. 2 illustrates the downstream and upstream protocols used in the cable modem 28. As is known in the art, the Open System Interconnection ("OSI") model is used to describe computer networks. The OSI model consists of seven layers including from lowest-to-highest, a physical, data-link, network, transport, session, presentation and application layer. The network layer places routing information into the data packets. The data link layer transmits data packets. The physical layer transmits the data packets and overhead as bits over a communication link.

For data transmission over a bi-directional data-over-cable system, the cable modem 28 is connected to the cable network 26 in a physical layer via a radio frequency ("RF") interface 52. In an exemplary preferred embodiment of the present invention, the RF interface 52 has an operation frequency range of approximately 50 Mega-Hertz ("MHz") to 1 Giga-Hertz ("GHz") and a channel bandwidth of 6 MHz on the downstream channels. In another exemplary preferred embodiment of the present invention, which relates to a bi-directional data-over-cable system, the RF interface 52 has an operation frequency range of approximately 5 MHz to 42 MHz on the upstream channels. However, other operation frequencies and bandwidths may also be used and the invention is not limited to these frequencies and bandwidths. The RF interface 52 preferably uses a signal modulation method of Quadrature Amplitude Modulation ("QAM"). As is known in the art, QAM is used as a means of encoding digital information over radio, wire, or fiber optic transmission links. QAM is a combination of amplitude and phase modulation and is an extension of multiphase phase-shift-keying. QAM can have any number of discrete digital levels typically including 4, 16, 64 or 256 levels.

In one embodiment of the present invention, QAM-64 is used in the RF interface 52 for downstream transmission. In another embodiment of the present invention, QAM-16 or Quadrature Phase-Shift-Keying ("QPSK") is used for upstream transmission. For the upstream embodiment, the symbol rate of upstream transmission may be 160, 320, 640, 1,280, or 2,560 kilo-symbols per second ("ksym/sec") for 16-QAM, or 160, 320, 640, 1,280, or 2,560 ksym/sec for QPSK. However, other operating frequencies, modulation methods, and symbol rates may alternatively be used. Other information on the RF interface 52 can be found in the Institute of Electrical and Electronic Engineers ("IEEE") standard 802.14 for cable modems, which is incorporated herein by reference. However, other RF interfaces 52 could also be used and the present invention is not limited to interfaces complying with IEEE 802.14.

Referring again to FIG. 2, above the RF interface 52 in a data-link layer is a Medium Access Control ("MAC") layer 54. As is known in the art, the MAC layer 54 controls access to a transmission medium via the physical layer. Information on the MAC layer protocol 54 may be found in DOCSIS. Other information can be found in the IEEE 802.14 for cable modems. However, other MAC layer 54 protocols may alternatively be used and the preferred embodiments are not limited to IEEE 802.14 MAC layer protocols.

Above both the downstream and upstream data-link layers in a network layer 52 is an Internet Protocol ("IP") layer 58. The IP layer 58, hereinafter IP 58, roughly corresponds to OSI layer 3, the network layer, but is typically not defined as part of the OSI model. As is known in the art, the IP 58 is a routing protocol designed to route traffic within a network or between networks. Additional information on the IP 58 may be found in the Internet Engineering Task Force ("IETF") standard Request For Comments ("RFC") 791—Internet Protocol, dated September 1981, incorporated herein by reference.

Also within the network layer of the protocol stack 50, an Internet Control Message Protocol ("ICMP") layer 56 is used for network management. The main functions of the ICMP layer 56, hereinafter ICMP 56, include error reporting, reachability testing (e.g., "pinging"), congestion control, route-change notification, performance, and subnet addressing. Since the IP 58 is an unacknowledged protocol, datagrams may be discarded and the ICMP 56 is used for error reporting. Additional information on the ICMP 56 may be found in IETF standard RFC 792—Internet Control Message Protocol, dated September 1981, incorporated herein by reference.

Above the IP 58 and the ICMP 56 is a transport layer with a User Datagram Protocol ("UDP") layer 60. The UDP layer 60, hereinafter UDP 60, roughly corresponds to OSI layer 4, the transport layer, but is typically not defined as part of the OSI model. As is known in the art, the UDP 60 provides a connectionless mode of communication with datagrams. Additional information on the UDP 60 may be found in IETF standard RFC 768—User Datagram Protocol, dated Aug. 28, 1980, incorporated herein by reference.

Above the network layer are a Simple Network Management Protocol ("SNMP") layer 62, a Trivial File Transfer Protocol ("TFTP") layer 64, a Dynamic Host Configuration Protocol ("DHCP") layer 66 and a UDP manager 68. The SNMP layer 62 is used to support network management functions. Additional information on the SNMP layer 62 may be found in IETF standard RFC 1157—A Simple Network Management Protocol (SNMP), dated May 1990, incorporated herein by reference. The TFTP layer 64 is a file transfer protocol used to download files and configuration information. Additional information on the TFTP layer 64 may be found in IETF standard RFC 1350—The TFTP Protocol (Revision 2), dated July 1992, incorporated herein by reference. The DHCP layer 66 is a protocol for passing configuration information to hosts on an IP 54 network. Additional information on the DHCP layer 66 may be found in IETF standard RFC 2131—Dynamic Host Configuration Protocol, dated March 1997, incorporated herein by reference. The UDP manager 68 distinguishes and routes packets to an appropriate service such as, a virtual tunnel known to those skilled in the art. More or few protocol layers could also be used with a data-over-cable system 16.

An operating environment for the cable modem 28 and other network devices of the present invention includes a processing system with at least one Central Processing Unit ("CPU") and a memory system. In accordance with the practices of persons skilled in the art of computer programming, the present invention is described below with reference to acts and symbolic representations of operations that are performed by the processing system, unless indicated otherwise. Such acts and operations are sometimes referred to as being "computer-executed", or "CPU executed."

It will be appreciated that the acts and symbolically represented operations include the manipulation of electrical signals by the CPU. The electrical signals represent data bits which cause a resulting transformation or reduction of the electrical signal representation, and the maintenance of data bits at memory locations in the memory system to thereby reconfigure or otherwise alter the CPU's operation, as well as other processing of signals. The memory locations where data bits are maintained are physical locations that have particular electrical, magnetic, optical, or organic properties, depending on the type of memory used, corresponding to the data bits.

The data bits may also be maintained on a computer readable medium including magnetic disks, optical disks, organic disks, and any other volatile or non-volatile mass storage system readable by the CPU. The computer readable medium includes cooperating or interconnected computer readable media, which exist exclusively on the processing system or is distributed among multiple interconnected processing systems that may be local or remote to the processing system.

Upstream Data Transmission

The upstream channel may be viewed as time-divided into a stream of mini-slots. A mini-slot is used as a unit of granularity for upstream transmission opportunities. A cable modem 28 is permitted to transmit on an upstream channel during a transmission mini-slot allocated by the CMTS 30. When a cable modem 28 wishes to transmit data it must first request permission from the CMTS 30. The CMTS 30 receives requests from a number of cable modems that wish to transmit and may allocate one or more transmission mini-slots to each of the cable modems. The cable modems alternately transmit during the mini-slots. Mini-slots are timed to prevent collisions between the transmissions from different cable modems.

Figure 3:
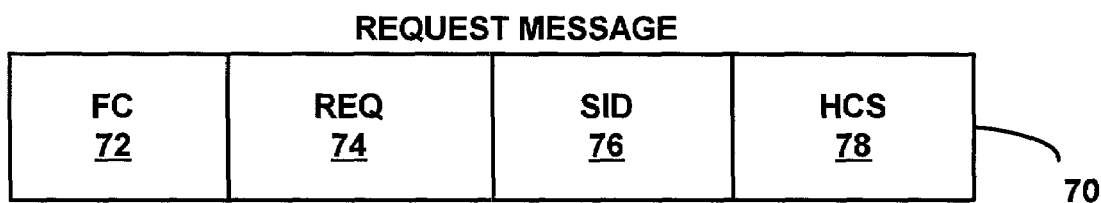
FIG. 3 is a block diagram illustrating a structure of a Request message that may be transmitted by a cable modem in the cable modem system of FIG. 1.

A cable modem 28 that wishes to transmit sends a Request MAC 54 message to the CMTS 30. FIG. 3 is a diagram illustrating a preferred structure of a Request message 70. The Request message 70 includes a frame control field 72 ("FC"), a bandwidth request field 74 ("REQ"), a service identifier field 76 ("SID"), and a MAC 54 header check sequence field 78 ("HCS"). Descriptions for the Request message 70 fields are shown in Table 1.

TABLE 1

| Request message 70 Parameter | Description |
| --- | --- |
| FC 72 | Frame control. Identifies type of MAC 54 message. |
| REQ 74 | Total amount of bandwidth requested in mini-slots. |
| SID 76 | Service Identifier for the cable modem 28 that sent the REQ message. |
| HCS 78 | MAC 54 header check sequence. |

The SID 76 is a unique identifier for the cable modem 28 that is requesting permission to transmit. The SID 76 may be assigned by the CMTS 30 when the cable modem 28 initializes and registers with the CMTS 30 as discussed below. The REQ 74 field contains a measure of how much bandwidth, i.e. mini-slots, the cable modem 28 requests for the transmission of its data to the CMTS 30.

Figure 4:
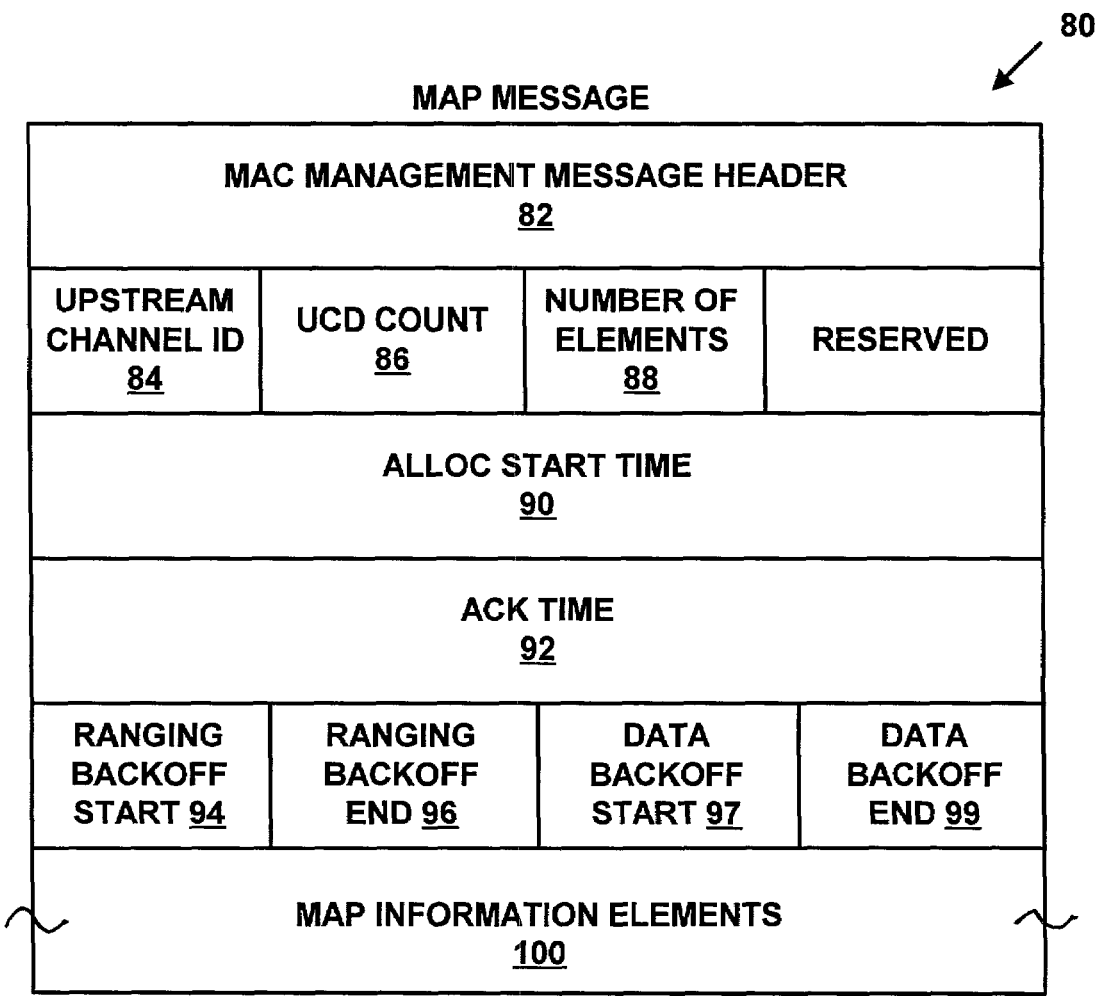
FIG. 4 is a block diagram illustrating the structure of a MAP message transmitted by a CMTS in the cable modem system of FIG. 1.

In response, the CMTS 30 builds an Upstream Bandwidth Allocation Map message 80 ("MAP") and transmits it via the downstream channel to all cable modems. FIG. 4 is a block diagram illustrating the structure of a preferred MAP message 80. The MAP message 80 includes a MAC 54 management header field 82, an upstream channel identifier field 84, a upstream channel descriptor count field 86 ("UCD Count"), a number of elements field 88, a reserved field, an allocation start time field 90 ("Alloc Start Time"), an acknowledgement time field 92 ("Ack Time"), a ranging backoff start field 94, a ranging backoff end field 96, a data backoff start field 97, a data backoff end field 99, and a MAP information elements field 100. Descriptions for the MAP message 80 fields are shown in Table 2.

TABLE 2

| MAP message 80 Parameter | Description |
| --- | --- |
| MAC 54 Management Message Header 84 | The header of this message identifying it as a MAP message. |
| Upstream Channel ID 84 | The identifier of the upstream channel to which this message belongs. |
| UCD Count 86 | Matched the value of the Configuration Change Count of the UCD which describes the burst parameters which apply to this map. |
| Number of Elements 88 | Number of information elements in the map. |
| Alloc Start Time 90 | Effective start time from CMTS 30 initialization (in mini-slots) for assignments within this map. |
| Ack Time 92 | Latest time, from CMTS 30 initialization, (mini-slots) processed in upstream. |
| Ranging Backoff Start 94 | Initial back-off window for initial ranging contention. |
| Ranging Backoff End 96 | Final back-off window for initial ranging contention. |
| Data Backoff Start | Initial back-off window for contention data and requests. |
| Data Backoff End | Final back-off window for contention data and requests. |
| MAP Information Elements 100 | Encoded data blocks that designate the allocation of transmission mini-slots on the upstream channel. |

The MAP message 80 informs the cable modems 28 of the allocation of mini-slots for a scheduled upstream usage interval and when to begin the usage interval. In a given upstream usage interval, selections of the cable modems 28 alternately transmit on the upstream channel. As is known in the art, each upstream usage interval is composed of transmission intervals, also referred to as "bursts," which comprise at least one mini-slot.

An identifier for the upstream channel to which the MAP message 80 applies is placed in the Upstream Channel ID field 84. The MAP Information Elements field 100 designates the order and duration of the transmissions from the cable modems 28. Each transmission may be described by one element. The number of elements in the MAP Information Elements field 100 is placed in the Number of Elements field 88.

FIG. 5 is a block diagram illustrating a preferred structure of MAP Information Elements 100. The MAP Information Elements field 100 designate intervals for transmissions by the cable modems 28 within the usage interval. Each interval includes a field for the SID 76 of the cable modem 28 that is permitted to transmit in each interval. The Interval Usage Code field 102 ("IUC") informs the cable modem 28 what kind of upstream transmission is permitted in the interval. The offset field 104 specifies when the transmission interval occurs. In this manner, the series of intervals permit the selection of cable modems 28 to deliver their data packets to the CMTS 30 without the transmissions colliding on the upstream path.

The IUCs 102 are values that designate the type of transmission that is permitted in each interval. The cable modems 28 may be capable of several types of transmission. For example, the transmission may be for the purposes of ranging, allowing a cable modem 28 to compensate for delay on the cable network. Additionally, the transmission may be for the purpose of delivering a data packet to the CMTS 30. Two types of data transmissions are typically permitted: a short data grant or a long data grant. These data grants have corresponding IUCs 102 as described in DOCSIS. For example, a short data grant may be appropriate when the CPE 14 only has a small amount of data to transmit on the upstream channel, such as a few keystrokes or the opening of a hyperlink on a web page. A long data grant may be appropriate when the CPE 14 requests to transfer a file through the backbone network 12.

As alternatives to the foregoing, other field settings for the Request message 70, the MAP message 80, and the MAP Information Elements 100 may be used. It should further be understood that other field structures and values may be used.

Parameters for Upstream Data Transmission

Additionally, data packets that are transmitted in adjacent mini-slots may be transmitted according to different transmission formats for the RF interface 52. The formats are associated with parameters for data transmission. In one exemplary preferred embodiment of the present invention, the parameters for upstream data transmission include the symbol rate, the upstream channel frequency, the modulation type, the preamble, and Forward Error Correction ("FEC") parameters as described in Table 3.

TABLE 3

| Parameter for data transmission | Description |
| --- | --- |
| Frequency | Center frequency of upstream channel (Hz). |
| Symbol rate | Multiples of base rate of 160 ksym/sec. |
| Modulation type | QPSK or 16-QAM. |
| Preamble | Training sequence of bits used for automatic gain control and modulation. |
| FEC level (T) | Amount of redundant bytes that are added to correct for errors. |
| FEC data coverage size (k) | Amount of bytes over which error correction is to be performed. |

As is known in the art, FEC adds redundant bits to the data packet to detect, locate, and correct transmission errors. The FEC level ("T") is a measure of the amount of redundant data that must be added to the data packet to allow for error correction. A higher value of T provides a better level of error correction. The FEC data coverage size ("k") is a measure of the amount of information over which data correction is to be performed. For the same FEC level, an increase in the FEC data coverage size will result in more errors going uncorrected. It should be understood that many more data transmission parameters are possible and that the present invention is not restricted to the parameters described herein.

Figure 6:
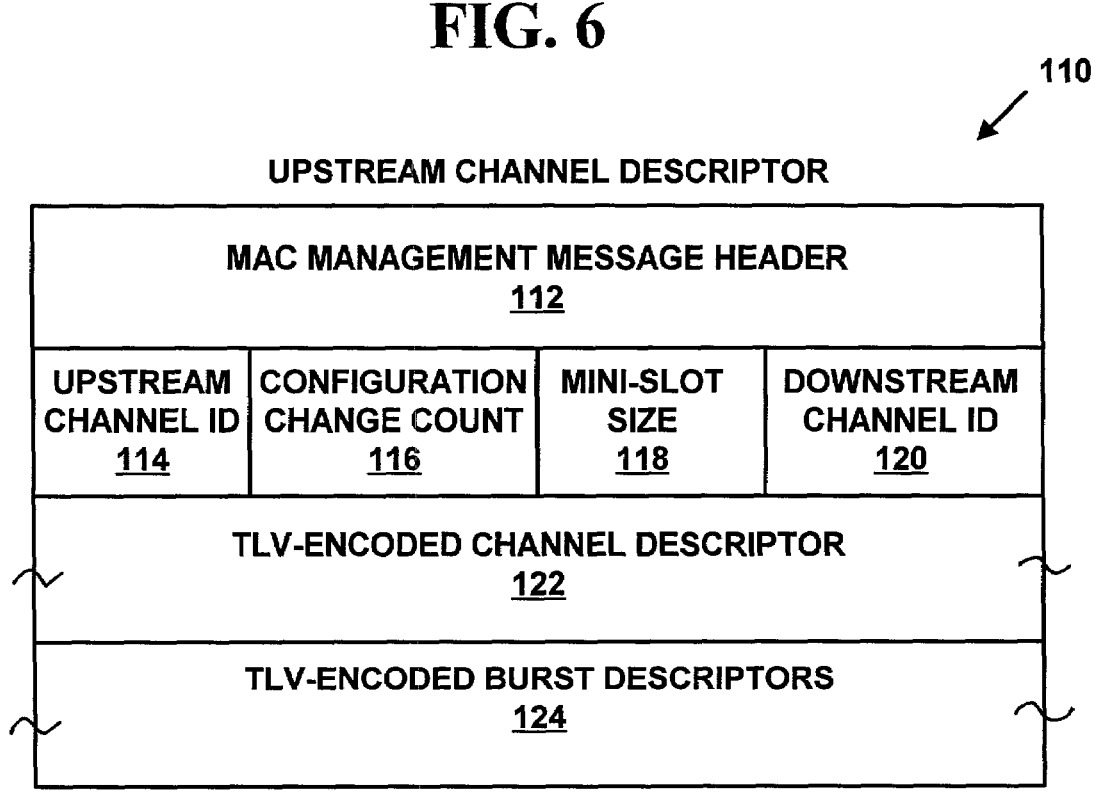
FIG. 6 is a block diagram illustrating the structure of a UCD message transmitted by a CMTS in the cable modem system of FIG. 1.

Each cable modem 28 transmitting in an upstream usage interval may transmit according to a different transmission format. Additionally, between upstream usage intervals, the cable modem 28 may each undergo reconfiguration so that their future transmissions occur according to another format. The CMTS 30 may reconfigure the cable modems 28 by issuing an Upstream Channel Descriptor ("UCD") message. FIG. 6 is a block diagram illustrating a preferred structure of a UCD message. The UCD message 110 includes a MAC 54 Management Message Header field 112, an upstream channel identifier field 114, a configuration change count field 116, a mini-slot size field 118, a downstream channel identifier field 120, a type-length-value ("TLV") encoded channel descriptor field 122, and TLV encoded burst descriptor field 124. Descriptions for the UCD message 110 fields are shown in Table 4.

TABLE 4

| UCD message 110 Parameter | Description |
| --- | --- |
| MAC 54 Management Message Header 112 | The header of this message identifying it as a UCD message. |
| Upstream Channel ID 114 | The identifier of the upstream channel to which this message belongs. |
| Configuration Change Count 116 | CMTS 30 increments by one whenever any descriptors change. |
| Mini-Slot Size 118 | The duration of a mini-slot. |
| Downstream Channel ID 120 | The identifier of the downstream channel on which this message has been transmitted. |
| TLV Encoded Channel Descriptors 122 | Data blocks which describe the parameters for data transmission to be implemented for the overall channel. |
| TLV Encoded Burst Descriptors 124 | Data blocks which describe the parameters for data transmission to be implemented for each burst. |

TLV encoding is known to those skilled in the art. A selection of parameters for the overall channel and the bursts are given in Table 3 above. These parameters may be encoded as channel or burst descriptors and incorporated into a UCD message 110 to reconfigure cable modems 28. However, it should be understood that other field structures and values for the UCD message 110 could be used for the present invention.

When the CMTS 30 changes the data transmission parameters for an upstream channel, it builds a UCD message 110 with channel and/or burst descriptors that correspond to the new parameters. The UCD message 110 is sent on the downstream channel 26 to the cable modems 28. The CMTS 30 also sends out a corresponding MAP message 80. The burst descriptors in the UCD message 110 correspond to the IUC fields 102 of the MAP Information Elements 100 of the MAP message 80. As each cable modem 28 transmits on the upstream channel it may be doing so according to data transmission parameters that are different from other cable modems 28. In this manner, the cable modems 28 within an upstream usage interval may alternately transmit data packets to the CMTS 30 according to independent data transmission parameters.

Initialization of a Cable Modem

Cable modem 28 data transmissions are scheduled and configured as discussed above. However, when a new cable modem joins the data-over-cable system, it must gain access to the system by undergoing an initialization procedure before it is permitted to transmit data. The procedure is typically divided into several phases:

1. Removable Security Module ("RSM") detection;
2. Scan for downstream channel and establish synchronization with the CMTS 30;
3. Obtain upstream transmission parameters from a UCD 110 message;
4. Perform Ranging;
5. Establish IP 58 connectivity;
6. Establish time of day;

7. Establish Security Association (if the RSM is present);

8. Transfer operational parameters; and

9. Initialize Baseline Privacy (if RSM is not present and if needed).

In the ranging phase, the cable modem 28 and CMTS 30 compare timers to detect delays in propagation of signals from the cable modem 28 to the CMTS 30. One source of the delay includes finite propagation times in the physical cable medium. The delays are typically larger than burst times and can lead to timing errors if left uncompensated.

The ranging phase discerns a timing offset such that the cable modem's 28 transmissions are aligned to the appropriate mini-slot boundary. Ranging adjusts each cable modem's 28 timing offset such that the cable modem 28 appears to be physically located right at the CMTS 30. The cable modem 28 transmits prematurely by an amount equal to the timing offset to ensure that the signal arrives at the CMTS 30 just when it is expected. Other transmission parameters, such as transmitted power from the cable modem 28, are also adjusted during the ranging phase.

After obtaining the upstream transmission parameters from a UCD 110 message, the cable modem 28 begins the ranging process. First, the cable modem 28 monitors MAP messages 80 and inspects the MAP Information Elements 100. As described above in relation to FIG. 5, the MAP Information Elements 100 designate intervals for cable modem 28 transmission within the usage interval covered by the MAP message 80. Each MAP Information Element 100 corresponds to a transmission interval, identifies which cable modem 28 is permitted to transmit in the interval using a Service Identifier 76 for the cable modem 28, specifies what type of transmission is permitted using an Interval Usage Code 102, and tells the cable modem 28 when to begin transmission using an offset 104. As described above and in DOCSIS, the types of permitted transmission for the interval include a short data grant and a long data grant. Additionally, the IUC 102 may indicate that the interval is to be used for Initial Maintenance or Station Maintenance as is known to those skilled in the cable modem art.

The cable modem 28 finds a MAP Information Element 100 in the MAP messages 80 that has an IUC 102 indicating an Initial Maintenance interval. The CMTS 30 has reserved this time interval for receiving ranging signals from any cable modems 28 that are initializing. It is during this interval that the cable modem 28 will start the ranging phase. The Initial Maintenance interval is a contention interval and many cable modems 28 may use this interval to start ranging. Because the cable modems 28 have not yet registered, the cable modem 28 have not been assigned SIDs 76 by the CMTS 30. The SID 76 for the Initial Maintenance interval in the MAP Information Elements 100 is typically a broadcast/multicast SID 76.

When the Initial Maintenance interval occurs, the cable modem 28 sends a ranging request ("RNG-REQ") message upstream to the CMTS 30. FIG. 7 is a block diagram illustrating a preferred structure of a RNG-REQ message 130. The Ranging Request message 130 includes a MAC 54 management header field 132, a service identifier field 76, a downstream channel identifier field 134, and a pending till complete field. Descriptions for the RNG-REQ message 130 fields are shown in Table 5.

TABLE 5

| RNG-REQ message 130 Parameter | Description |
| --- | --- |
| MAC 54 Management Message Header 132 | The header of this message identifying it as a Ranging Request message. |
| SID 76 | For RNG-REQ messages transmitted in Initial Maintenance intervals:<br>1. Initialization SID if cable modem 28 is attempting to join the network;<br>2. Initialization SID if cable modem 28 has not registered and is changing downstream channels;<br>3. Temporary SID if cable modem 28 has not yet registered and is changing upstream channels; and<br>4. Registration SID if cable modem 28 is registered and is changing upstream channels.<br>For RNG-REQ messages transmitted in Station Maintenance intervals:<br>Assigned SID. |
| Downstream Channel ID 134 | The identifier of the downstream channel on which the cable modem 28 received the initial UCD message 110. |
| Pending Till Complete | If zero, all previous Ranging Response attributes have been applied prior to transmitting this RNG-REQ.<br>In non-zero, this is the time estimated to be needed to complete assimilation of ranging parameters. |

The initialization SID 76 that the cable modem 28 places in the SID 76 field of the RNG-REQ message 130 is typically zero. This indicates to the CMTS 30 that the cable modem 28 has not registered before. If the SID 76 is non-zero, the CMTS 30 assumes that the cable modem 28 has previously undergone initialization but on another upstream channel.

In response to receiving the RNG-REQ message 130 from the cable modem 28, the CMTS 30 transmits a Ranging Response ("RNG-RSP") message 140. FIG. 8 is a block diagram illustrating a preferred structure of a RNG-RSP message 140. The Ranging Response message 140 includes a MAC 54 management header field 142, a service identifier field 76, an upstream channel identifier field 144, and a TLV encoded ranging information field 146. Descriptions for the RNG-RSP message 140 fields are shown in Table 6.

TABLE 6

| RNG-RSP message 140 Parameter | Description |
| --- | --- |
| MAC 54 Management Message Header 142 | The header of this message identifying it as a Ranging Response message. |
| SID 76 | For RNG-REQ messages transmitted in Initial Maintenance intervals that had an initialization SID:<br>   Assigned temporary SID.<br>For RNG-REQ messages not transmitted in Initial Maintenance intervals that had an initialization SID:<br>   Same SID as in RNG-REQ. |

TABLE 6-continued

| RNG-RSP message 140 Parameter | Description |
|---|---|
| | If instructing cable modem 28 to move to a different channel: Initialization SID. |
| Upstream Channel ID 144 | The identifier of the upstream channel on which the CMTS 30 received the RNG-REQ message. |
| TLV encoded ranging information 146 | Includes: 1. Timing adjust information; 2. Power adjust information; 3. Frequency adjust information; 4. cable modem 28 transmitter equalization information; 5. Ranging status; 6. Downstream frequency override; and 7. Upstream channel ID override. |

During the initial ranging, the RNG-RSP message 140 contains a temporary SID 76 for the cable modem 28. This SID 76 identifies the cable modem 28 to the CMTS 30 until it has completed a registration process. The RNG-RSP message 140 also includes information on RF power adjustments, transmission frequency adjustments, and offset timing adjustments that the cable modem 28 should adopt so as to improve communications from the cable modem 28 to the CMTS 30.

In response to the RNG-RSP message 140, the cable modem 28 monitors the downstream channel and examines the MAP 80 messages. In particular, the cable modem 28 looks for a MAP Information Element 100 in the MAP messages 80 that has an IUC 102 indicating a Station Maintenance interval and an associated SID 76 field containing the temporary SID 76 assigned to the cable modem 28. The CMTS 30 has reserved this time interval for receiving ranging signals from only the cable modem 28 associated with the temporary SID 76.

When the Station Maintenance interval occurs, the cable modem 28 sends another RNG-REQ message 130 upstream to the CMTS 30. In return, the CMTS 30 returns a RNG-RSP message 140 with appropriate corrections to the transmission parameters in the ranging information field 146. The sequence of RNG-REQ 130 and RNG-RSP 140 is repeated until the CMTS 30 sends a RNG-RSP message 140 notifying the cable modem 28 that the ranging is successful.

Figure 9A:
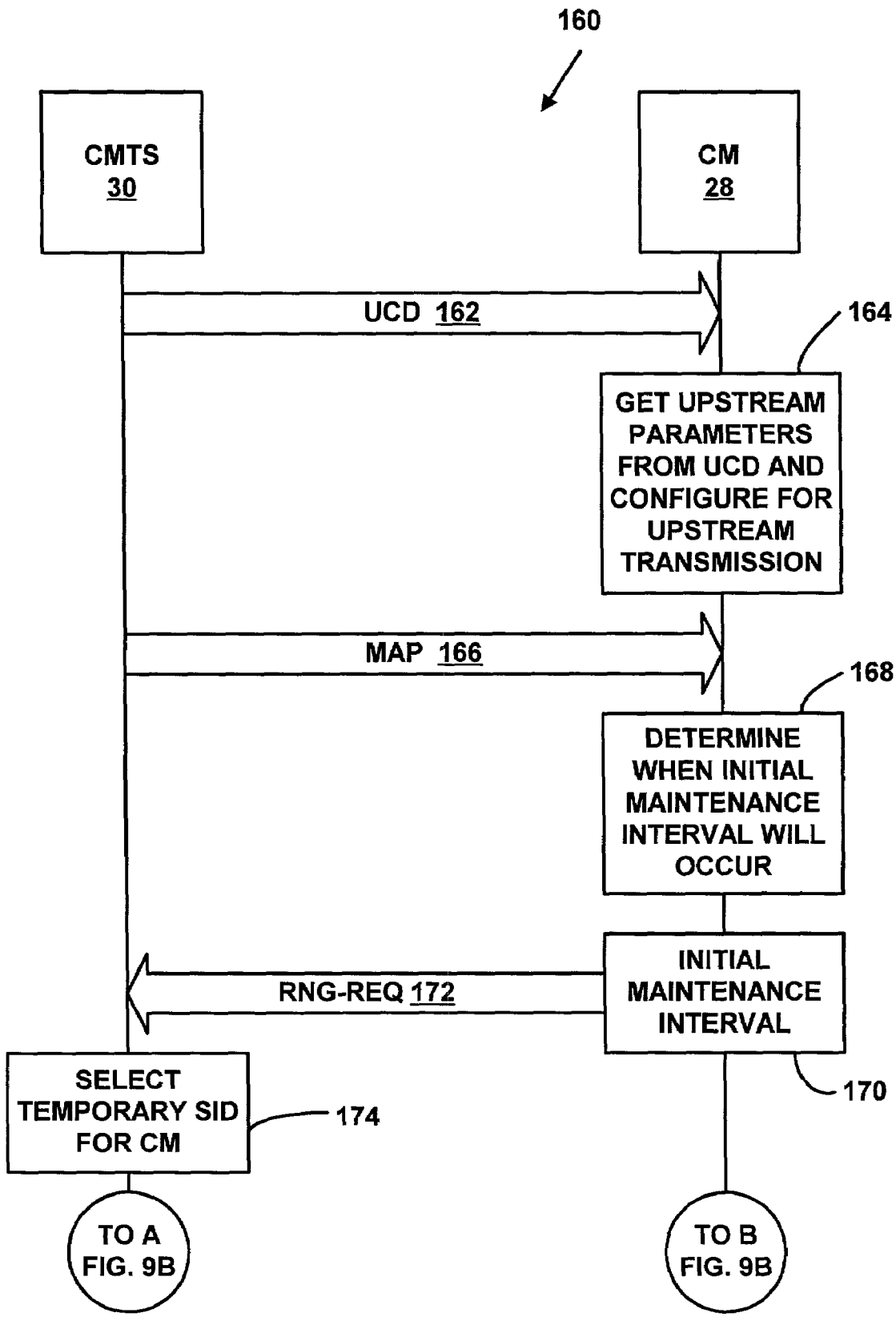
FIG. 9 is a block diagram illustrating a typical message flow during CM initialization in the cable modem system depicted in FIG. 1.
Figure 9B:
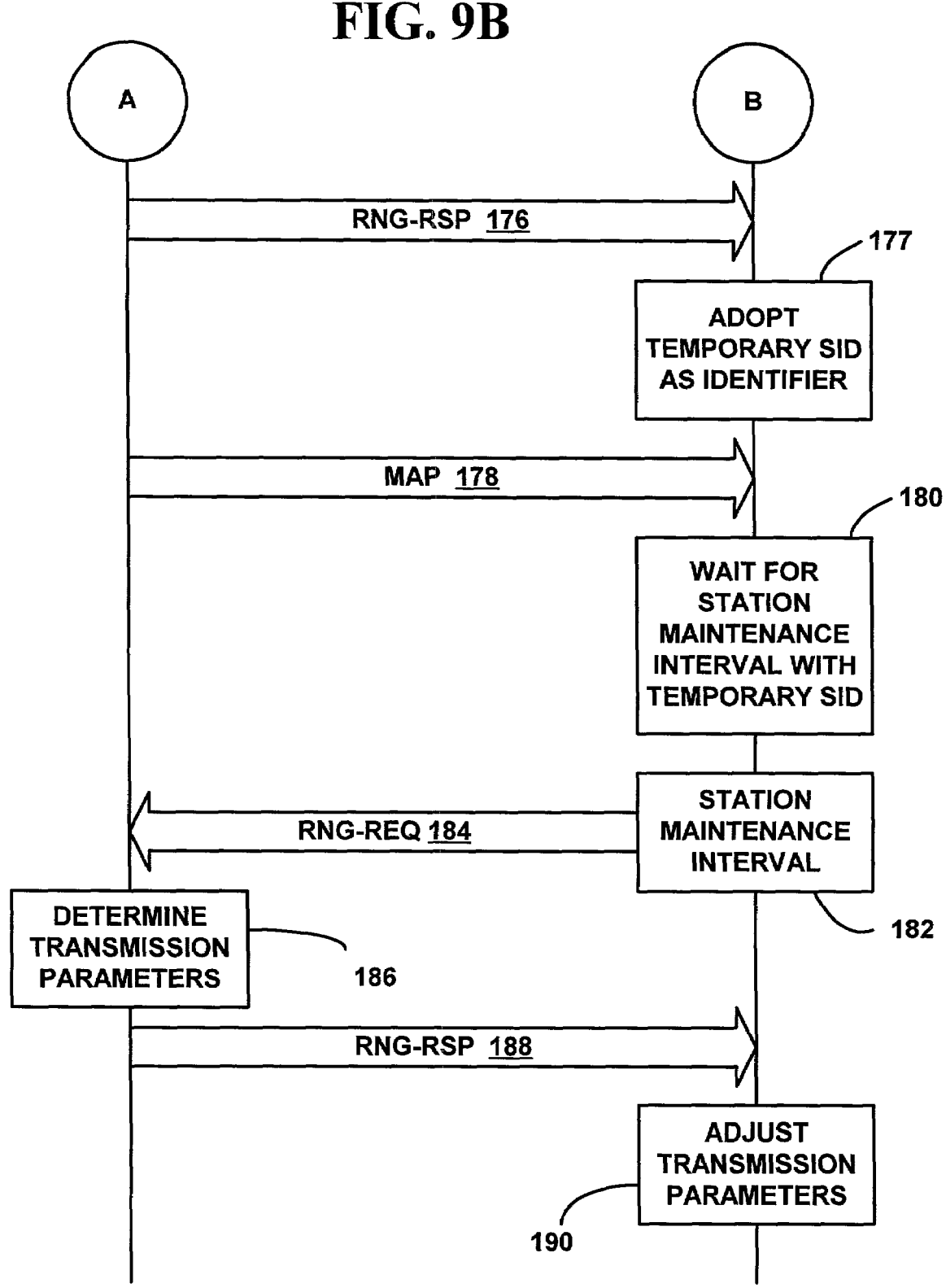

FIG. 9 is a block diagram illustrating a typical message flow 160 during cable modem 28 initialization. The CMTS 30 sends a UCD 110 message 162 downstream describing the parameters for transmission in the upstream channel. The cable modem 28 receives the UCD message 162, extracts the transmission parameters from the UCD message 162, and configures itself to transmit with these parameters at step 164. The cable modem 28 then monitors the downstream channel for a MAP 80 message. When the cable modem 28 receives a MAP message 166, the cable modem 28 determines when the next Initial Maintenance interval will occur at step 168.

During the Initial Maintenance interval 170, the cable modem 28 sends a RNG-REQ message 172 upstream to the CMTS 30. The RNG-REQ message 172 may have its SID field 76 set to zero to indicate that the cable modem 28 is initializing. The CMTS 30 receives the RNG-REQ message 172 and selects a temporary SID for the cable modem 28 at step 174. The CMTS 30 sends a RNG-RSP message 176 with this temporary SID to the cable modem 28. The cable modem 28 adopts this temporary SID as its identifier at step 177.

The cable modem 28 waits for another MAP message 178 that includes a MAP information element 100 for a Station Maintenance interval for the temporary SID at step 180. When this Station Maintenance interval arrives at step 182, the cable modem 28 transmits another RNG-REQ message 184 upstream to the CMTS 30. In response, the CMTS 30 determines adjustments to the cable modem 28 transmission parameters at step 186 and transmits the parameters to the cable modem 28 in a RNG-RSP message 188. The cable modem 28 receives the RNG-RSP message 188 and correspondingly adjusts its transmission parameters at step 190.

Initial Upstream Transmit Levels for Cable Modems

At present, a cable modem 28 arbitrarily selects an initial transmit level when sending a RNG-REQ message 130 during an Initial Maintenance interval. Typically, a cable modem 28 starts transmitting with a minimum specified transmit power level (typically 8 dBmV) for the first RNG-REQ message 130. If there is no returned RNG-RSP message 140 in response to the RNG-REQ message 130, the cable modem 28 increases the power level and transmits another RNG-REQ message 130. This process is repeated until a RNG-REQ message 130 is acknowledged by the CMTS 30 in the form of a RNG-RSP message 140. Unfortunately, this process may be slow since the cable modem 28 may be required to attempt ranging many times until the transmit level is of sufficient magnitude to be recognized by the CMTS 30.

In addition, multiple attempts at initial ranging may increase the probability of collisions with RNG-REQ messages 130 from any other cable modems 28 that are undergoing initialization in the same Initial Maintenance interval. Reducing the probability of collisions may be accomplished by changing the ranging backoff parameters (94,96) in a MAP message 80. However, changing the ranging backoff parameters (94,96) to reduce collisions has the advantage of increasing the time between cable modem 28 RNG-REQ messages 130. The cable modem 28 will still gradually increase its transmit level from the minimum transmit level until it is recognized by the CMTS 30, although now the time between these level increases is longer. This may further increase the time it takes for a cable modem 28 to initialize. Therefore, changing ranging backoff in a MAP message 130 does not necessarily lead to a decreased initialization time for a cable modem 28 but may more likely prolong cable modem 28 initialization.

Figure 10:
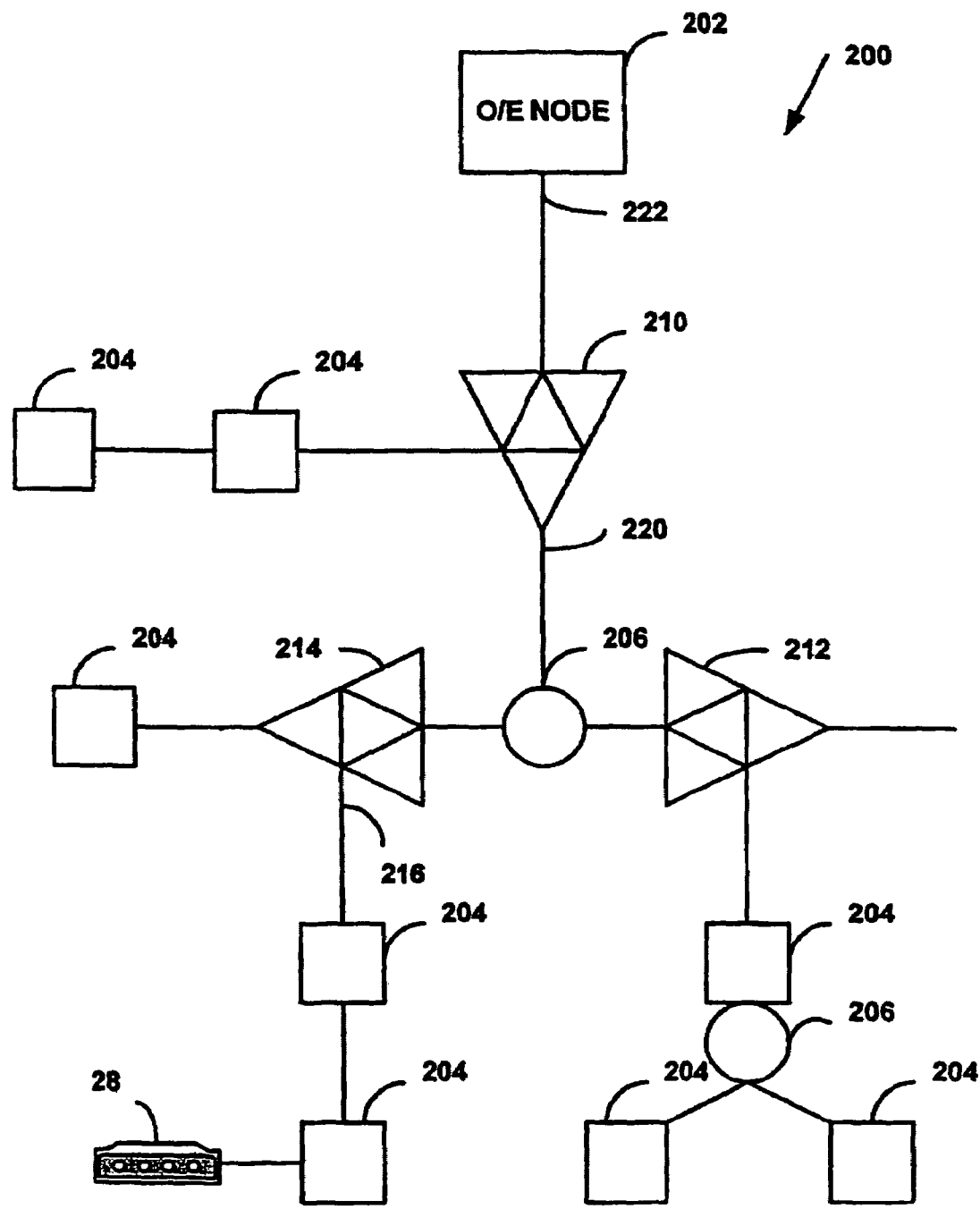
FIG. 10 is a block diagram illustrating a configuration of Hybrid Fiber/Coaxial network.

The difficulty of estimating a proper initial transmit level may be appreciated with reference to FIG. 10. FIG. 10 is a block diagram illustrating a configuration of a Hybrid Fiber/Coaxial (HFC) network 200. An output of an O/E node 202 feeds RF signals downstream 222 first to a bi-directional RF amplifier 210. The first amplifier 210 delivers the downstream signal to customers by means of taps 204 (represented by squares) and splitters 206 (represented by circles). A tap 204 is a drop point on a RF coaxial distribution cable that permits a portion of the RF signal to be diverted to customers by means of drop cables. A splitter 206 divides input RF power between two or more outputs. As illustrated in FIG. 10, the downstream RF output 220 of the first amplifier 210 is split between two other bi-directional amplifiers on the right 212 and left 214. The left amplifier 214 forwards the downstream RF signal through one output 218 to a tap and through another output 216 to a series of taps. The cable modem 28 receives the downstream RF signal from the second tap from the latter output 216. Although not illustrated, additional cable modems 28 are typically coupled to the outer tap 204.

In the upstream direction of FIG. 10, the cable modem 28 has to send its RF signal through two taps to an upstream input 216 of the left amplifier 214, through the splitter between the left 214 and right 212 amplifiers, to the upstream input 220 of the first amplifier 210. The upstream RF signal is then received by the upstream input to the O/E node 202 where it is eventually delivered to the CMTS 30. As can be seen from FIG. 10, the upstream signal has to wind its way back up the cable network 200 through many different pieces of RF equipment.

Typically, HFC networks are designed for unity gain in a reverse direction. That is, the signal level at the upstream input to each amplifier is the same. For example, suppose cable modem 28 launches a signal that is at a level of "X" dBmV as measured at the upstream input 216 of the left amplifier 214. Unity gain means that when the signal traverses the network to the upstream input 220 of the next amplifier 210, the level will again be "X" dBmV. The left amplifier's 214 upstream gain is adjusted so that the levels are the same at points 216 and 220. The amplifiers are configured such that the same signal level occurs at each upstream input in the signal path back to the CMTS 30.

If the cable modem 28 could know in advance what its required level at the upstream inputs should be, and if it could know the loss from its location back to the upstream input, it would be able to determine the proper transmit level. By the nature of HFC designs, the reverse path loss from each cable modem 28 back to the first encountered upstream input will be different. In the downstream direction, taps that are closer to the output of an amplifier more strongly attenuate the downstream signal compared to taps that are farther from the output. Thus cable modems 28 that are closest to the upstream input will typically be fed by a high value tap compared to cable modems 28 that are farther from the upstream input. Consequently, their upstream path loss will be large compared to the upstream path loss for a cable modem 28 farther downstream. Cable modems 28 that are fed by the last tap before the next amplifier downstream will be fed by a lower value tap and will therefore have a lower loss back to an upstream input. With various drop lengths and inside wiring configurations, this difference between locations could typically be greater than 20 dB. Due to such a variation in loss, a fixed loss value cannot be used to estimate a proper transmit level for a cable modem 28.

In addition, the loss spectrum varies with location. Passive insertion loss occurs in devices such as taps and splitters, and it is typically linear and flat across the cable RF spectrum. However, attenuation loss from the hard line and drop cable that connects the amplifiers, taps, and splitters to the cable modem 28 is frequency dependent. Attenuation loss typically increases exponentially with frequency. Additionally, the difference in attenuation loss between two frequencies increases with cable length due to dielectric effects in the cable.

An estimate of loss in the upstream direction to the nearest amplifier at the upstream frequency may enable the cable modem 28 to determine a proper transmit level. The transmit level would be such that the RF power is at the appropriate level when the signal reaches the input of the nearest amplifier. Injecting a signal at the proper transmit level may ensure that the CMTS 30 receives a RNG-REQ message 130 from the cable modem 28 after only a few attempts at initial ranging. A minimal number of RNG-REQ messages 130 transmitted by multiple initializing cable modems 28 may also result in fewer collisions and hence a shorter initialization time for all cable modems 28.

Estimating an Initial Upstream Transmit Level

In accordance with a preferred embodiment, an estimate of loss in the upstream direction to the nearest amplifier is determined by estimating loss in the downstream direction from the nearest amplifier. Similar to the upstream path, the downstream path is expected to have consistent setup levels at the outputs of the amplifiers. The levels may be different for trunk and feeder lines, but since taps are typically not placed on trunk lines, levels at the outputs to feeder lines may be used as a reference. Cable networks 26 are typically configured such that the setup level at downstream outputs is consistent across the system and the setup level at the upstream inputs is also consistent, as described above.

For example, a downstream output from a typical amplifier, e.g. the left amplifier 214, may have a output setup level of 35 dBmV as measured at a frequency of 55 MHz and 44 dBmV as measured at a frequency of 750 MHz. The output level as set up is typically greater at the higher frequency to pre-compensate for higher frequency attenuation loss in the cable. The same bi-directional amplifier 214 may also require an upstream input setup level of 15 dBmV. Signal levels in both directions are measured at the downstream output/upstream input 216 to the amplifier 214. If the cable modem 28 receives the downstream signal from the amplifier 214 and measures the signal level at 55 MHz (channel 2) to be 5 dBmV, an estimate of the path loss may be determined to be 30 dB. Armed with an estimate of 30 dB loss for the path, therefore, one approach to decrease ranging time is to allow the cable modem 28 to set its transmit level to 15 dBmV+30 dB=45 dBmV in order that its upstream transmissions reach the amplifier at the required signal strength.

This transmit level, however, may be an overcompensation. It may be too large because the loss in the 5–42 MHz range, within which typical upstream channel frequencies reside, will be less than that at 55 MHz. The estimated 45 dBmV launch power may need to be scaled back accordingly to prevent the upstream signal from overdriving the amplifier at the upstream frequency. Additionally, to prevent overdriving, the estimated transmit level may also be reduced by a margin to compensate for deviations in setup levels that may exist across the cable network 200.

Thus, in accordance with a more preferable approach, an estimate for the transmit level of the cable modem 28 may be derived from a measurement of the signal level received by the cable modem 28 and setup parameters of the network 26, for example as shown in Equation 1:

$$T_{CM} = I_{amp} + (O_{amp} - R_{CM} - F - M) \quad (1)$$

where $T_{CM}$ is the estimated transmit level of the cable modem 28. In Equation 1, $I_{amp}$ is the expected (setup) upstream input to an amplifier and the term in brackets represents the estimated loss in the path from the amplifier to the cable modem 28. The estimated loss in the path is the difference between the expected (setup) output level of the amplifier, as measured at the frequency of the lowest channel, $O_{amp}$, and the measured level of signals received by the cable modem 28 at the lowest channel, $R_{CM}$. The estimated loss is reduced by a value F reflecting the difference between the loss at the frequency of the lowest downstream channel (or other reference frequency) and the loss at the (lower) frequency of the upstream channel, and further reduced by a value M for the margin reflecting deviations in the setup values that may occur in the cable network. With reference to the above example, $I_{amp}$=15 dBmV, $O_{amp}$=35 dBmV, and $R_{CM}$=5 dBmV. F is the difference between the loss measured at 20 MHz and the loss measured at 55 MHz. M depends on tolerances in the cable network 26, drift in the amplifiers and other system characteristics that may arise from setup inaccuracies. It should be understood, however, that the present invention is not limited to the above setup parameters of the network and their combination in Equation 1, and that other parameters and combinations are possible.

The estimate of the upstream transmit level from Equation 1 may be recast as shown in Equation 2:

$$T_{CM}=(I_{amp}+O_{amp}-F-M)-R_{CM} \quad (2)$$

The expression inside the brackets includes setup and network parameters and may be replaced by a single value that is characteristic of the cable network 26. Armed with this characteristic value, the cable modem 28 may subtract the measured downstream signal level from the characteristic value to arrive at an estimate for its proper upstream transmit level as described below. Transmitting at this proper level may ensure that the cable modem 28 makes only a few attempts at initial ranging before receiving a RNG-RSP message 140 from the CMTS 30.

FIG. 11 is a flow diagram illustrating a method 250 for estimating an initial transmit level for a cable modem 28 to range on an upstream channel. The method 250 includes ascertaining a characteristic value for a data-over-cable system at step 252. The characteristic value is associated with expected values for configuration parameters in the system. At step 254, a signal level of a downstream channel is measured at the cable modem 28. The initial transmit level for the cable modem 28 is set at step 256. The set initial transmit level is a difference between the characteristic value determined at step 252 and the signal level of the downstream channel measured at step 254. In this manner, the cable modem 28 begins its ranging at the initial transmit level and may be recognized by the CMTS 30 sooner than if the cable modem 28 had begun ranging at a minimum specified transmit level.

In one exemplary preferred embodiment of the present invention, parameters such as a setup upstream input level, a setup downstream output level for the lowest channel, a frequency differential, and a margin are provided to a cable modem 28 inside a UCD message 110. An appropriate TLV encoding of the these values may be included as descriptors of the upstream channel in the TLV encoded channel descriptor field 122 of the UCD message 110. Alternatively, in another exemplary preferred embodiment, since these numbers will be summed to generate the estimate, a single entry which provides a summed characteristic value may be included in the TLV encoded channel descriptor field 122 of the UCD message 110. In the TLV channel parameters, a new type parameter may be declared to indicate to the cable modem 28 that the TLV channel descriptor includes a value or values for setting the initial upstream transmit level. In yet another exemplary preferred embodiment, if the UCD message 110 does not include a value or values, the cable modem 28 may use default values stored in its memory as a backup.

Dynamically Adjusting the Estimated Initial Transmit Level

The characteristic value above is used to calculate an estimated initial transmit level. This value is derived from expected static parameters for the cable network 26. The network 26, however, may deviate from its expected behavior. Moreover, the deviation may vary with time as cable modems 28 join the cable network 26. Faults in the physical plant of the cable network 26, e.g. failed splitters, damaged cable line or misbehaving amplifiers, may occur at any time and may not be anticipated by the cable company. Impairments in signal transmission may develop from a noisy cable modem 28 or an interfering external RF source. Signal degradation may occur from cross-talk between cable modems 28 on upstream cable paths, bugs in one or more cable modem's 28 software for time division multiplexing, or flaws in the O/E nodes 24 in the data-over-cable system 16.

If the estimated initial transmit level is not high enough, the first RNG-REQ messages 130 from the cable modem 28 may still not be of sufficient strength to be recognized by the CMTS 30. As described above, the cable modem 28 increases its transmit level and sends another RNG-REQ messages 130. The cable modem 28 continues increasing its level and transmitting until the CMTS 30 responds. Even though the cable modem 28 starts its stepwise increase in level from the higher, estimated, baseline initial transmit level as calculated above, the cable modem 28 may still have to send many RNG-REQ messages 130 until it receives a RNG-RSP message 140.

Real time adjustment of initial transmit values for initiating cable modems 28, may be achieved by allowing each cable modem 28 that has successfully ranged to report a difference between its final transmit level and its estimated initial transmit level. The information from the initialized cable modems 28 could be collected by the CMTS 30 and manipulated, e.g. by averaging, weighting, or some other statistical method, to provide an implementation delta value, Δ. This implementation delta value may be added to the above estimated initial transmit level to compensate for anomalies in a given network that may be the result of incorrect set up levels, unforeseen additional losses in one path but not the other, or other factors. In this manner, initial transmit levels may be adjusted such that station equipment is not overdriven, or such that initial RNG-REQ messages 130 generate responses within a few attempts.

FIG. 12 is a flow diagram illustrating a method 260 for adjusting an initial transmit level for a cable modem 28 to range on an upstream channel. The method 260 includes receiving an implementation delta value on the cable modem 28 in a message from the CMTS 30 at step 262. The implementation delta value represents a dynamical correction to an initial transmit level that is responsive to changes in the data-over-cable network. At step 264 the initial transmit level is adjusted by adding the implementation delta value. In this manner, the cable modem 28 begins ranging at the adjusted initial transmit level and is likely to be recognized by the CMTS 30 with fewer attempts than if the cable modem 28 began ranging at a minimum specified transmit level.

In another exemplary preferred embodiment of the present invention, the implementation delta value is sent to the cable modem 28 via a UCD message 110. The implementation delta value occurs in a TLV encoded channel descriptor field 122 of the UCD message 110. Sending the implementation delta value to the cable modem 28 by a UCD message 110 may be more appropriate if the delta value changes infrequently. All cable modems 28 on the cable network 26 process the UCD message 110 and may result in extensive processing if the delta value changes more frequently.

In yet another exemplary preferred embodiment of the present invention, the implementation delta information is sent to the cable modem 28 via a new entry in a MAP message 80. If this delta value is changing frequently, the MAP 80 may be a better vehicle for transport versus a UCD 110 since each MAP 80 is different whereas a UCD 110 may tend to remain constant in time. The implementation delta value could be placed in the MAP 80 as a MAP information element 100 using a reserved IUC 102, a broadcast/multicast SID 76, and an offset 104 equal to the MAP 80 length. As is known in the art, such a MAP information element 100 would behave like a data acknowledgement. Once received by a cable modem 28, the implementation delta value is added to the estimated initial transmit level received from a UCD 110 message as described above. A dynamically adjusted estimate of the initial transmit level is thus shown in Equation 3:

$$T_{CM} = (I_{amp} + O_{amp} - F - M) + -R_{CM} \qquad (3)$$

The first parameters in the brackets may be received from the CMTS 30 in a UCD message 110, either separately or as a single value. This may occur when the cable modem 28 first retrieves the parameters for upstream transmission, e.g. in the UCD message 162 of FIG. 9. The implementation delta parameter may be received from the CMTS 30 in a MAP message 80. This may occur when the cable modem 28 receives a MAP message 80 to find an Initial Maintenance interval, e.g. in the MAP message 166 of FIG. 9. The cable modem 28 measures a value for the downstream signal level $R_{CM}$ and calculates an estimated initial transmit signal level from Equation 3. After the cable modem 28 has successfully initialized, it conveys a difference value between its final transmit level and this estimated initial transmit signal level to the CMTS 30. The CMTS 30 collects the difference values from all cable modems 28 on the cable network 26 and determines another value for the implementation delta parameter.

The above method for estimating an initial transmit level may also provide an indication as to the potential cause of a ranging failure. If an estimation of an initial transmit level exceeds its transmit capability, the cable modem 28 may scale the estimated level back to within an operational range. If the subsequent ranging was successful, the cable modem 28 may not have to do anything further. If ranging failed, however, the cable modem 28 may give an indication to a user of the cable modem 28 that a potential cause of the initialization failure was excessive reverse path loss.

Whether using the initial transmit level from the UCD message 110 or the adjusted initial transmit level from a MAP message 80, the cable modem 28 examines the MAPs to find the next Initial Maintenance opportunity. With an opportunity found, the cable modem 28 begins the standard ranging procedure starting with the initial transmit level. If ranging and initialization is successful, the cable modem 28 may create a difference value, calculated as the difference between the final transmit level and the initial transmit level and make it available to the CMTS 30 in a Management Information Base ("MIB"). As is known in the art, a MIB is a repository of information collected for access by a network management protocol. In accordance with a preferred embodiment, the MIB information would be retrieved by the CMTS 30 after each cable modem 28 initialized on the network. The collection of difference values may then be processed by the CMTS 30 with the resultant value placed in the MAP 80 as the implementation delta value. The implementation delta value may be a worse case value, e.g. a maximum of the differences from the multiple cable modems 28. The worse case value typically adjusts the cable modems' 28 initial transmit levels to values that overcompensate for path loss as most cable modems 28 will have had a better success at ranging. Alternatively, the implementation delta value may be a straight or weighted average of the difference values and may depend on the margin parameter M of the network.

It should be understood that the programs, processes, methods, systems and apparatus described herein are not related or limited to any particular type of computer apparatus (hardware or software), unless indicated otherwise. Various types of general purpose or specialized computer apparatus may be used with or perform operations in accordance with the teachings described herein.

In view of the wide variety of embodiments to which the principles of the invention can be applied, it should be understood that the illustrated embodiments are exemplary only, and should not be taken as limiting the scope of the present invention. For example, the Steps of the flow diagrams may be taken in sequences other than those described, and more or fewer elements or component may be used in the block diagrams.

The claims should not be read as limited to the described order or elements unless stated to that effect. In addition, use of the term "means" in any claim is intended to invoke 35 U.S.C. §112, paragraph 6, and any claim without the word "means" is not so intended. Therefore, all embodiments that come within the scope and spirit of the following claims and equivalents thereto are claimed as the invention.

We claim:

1. In a data-over-cable system, a method for estimating an initial transmit level for a cable modem to range on an upstream channel, the upstream channel carrying data transmissions from a plurality of cable modems to a cable modem termination system at a head-end of a cable network, the method comprising the steps of:
    ascertaining a characteristic value for the data-over-cable system, wherein the characteristic value is associated with configuration parameters for the data-over-cable system;
    measuring a signal level of a downstream channel at the cable modem, wherein the downstream channel carries signals from the head-end to the plurality of cable modems; and
    setting the initial transmit level to a difference between the characteristic value and the signal level of the downstream channel,
    whereby the cable modem begins ranging at the initial transmit level and is recognized by the cable modem termination system with fewer attempts than if the cable modem began ranging at a minimum specified transmit level.

2. A computer readable medium having stored therein instructions for causing a central processing unit to execute the method of claim 1.

3. The method of claim 1 wherein the ascertaining step comprises:
    receiving a message on the cable modem from the cable modem termination system, wherein the message contains the characteristic value.

4. The method of claim 3 wherein the characteristic value is a combination of the configuration parameters selected from a group consisting of a setup upstream input level, a setup downstream output level for the lowest channel, a frequency differential, or a margin.

5. The method of claim 3 wherein the message is an Upstream Channel Descriptor message.

6. The method of claim 1 wherein the ascertaining step comprises the steps of:

receiving a message on the cable modem from the cable modem termination system, wherein the message contains the configuration parameters; and calculating the characteristic value from the configuration parameters.

7. The method of claim 6 wherein the configuration parameters are selected from a group consisting of a setup upstream input level, a setup downstream output level for the lowest channel, a frequency differential, or a margin.

8. The method of claim 6 wherein the message is an Upstream Channel Descriptor message.

9. The method of claim 1 wherein the ascertaining step comprises:

retrieving the characteristic value from memory in the cable modem.

10. In a data-over-cable system, a method for adjusting an initial transmit level for a cable modem to range on an upstream channel, the upstream channel carrying data transmissions from a plurality of cable modems to a cable modem termination system at a head-end of a cable network, the method comprising the steps of:

receiving an implementation delta value on the cable modem in a message from the cable modem termination system, wherein the implementation delta value represents a dynamical correction to the initial transmit level that is responsive to changes in the data-over-cable network; and adjusting the initial transmit level by adding the implementation delta value, whereby the cable modem begins ranging at the adjusted initial transmit level and is recognized by the cable modem termination system with fewer attempts than if the cable modem began ranging at a minimum specified transmit level.

11. A computer readable medium having stored therein instructions for causing a central processing unit to execute the method of claim 10.

12. The method of claim 10 wherein the message is an Upstream Channel Descriptor message.

13. The method of claim 10 wherein the message is a Bandwidth Allocation MAP message.

14. The method of claim 10 further comprising:

undergoing an initial ranging phase, wherein the cable modem repeatedly transmits to the cable modem termination system with a stepwise increase in signal level beginning with the initial transmit level and ending at a final transmit level when the cable modem receives an acknowledgment;

providing a difference between the final transmit level and the initial transmit level to the cable modem termination system, whereby the cable modem termination system receives the difference from the cable modem and combines the difference with difference values from the plurality of cable modems to update the implementation delta value.

15. The method of claim 14 wherein the providing step comprises:

storing the difference in a Management Information Base on the cable modem, wherein entries in the Management Information Base are able to be read by the cable modem termination system.

16. In a data-over-cable system, a method for improving ranging of a plurality of cable modems on an upstream channel, the upstream channel carrying data transmissions from the plurality of cable modems to a cable modem termination system at a head-end of a cable network, the method comprising the step of:

sending configuration information in a message from the cable modem termination system to the plurality of cable modems, wherein the configuration information is combined with a signal level for downstream transmissions as measured by a cable modem to provide an estimate for an initial transmit level for the cable modem during ranging, whereby the cable modem begins ranging at the initial transmit level and is recognized by the cable modem termination system with fewer attempts than if the cable modem began ranging at a minimum specified transmit level.

17. A computer readable medium having stored therein instructions for causing a central processing unit to execute the method of claim 16.

18. The method of claim 16 wherein the configuration information are configuration parameters selected from a group consisting of a setup upstream input level, a setup downstream output level for the lowest channel, a frequency differential, or a margin.

19. The method of claim 16 wherein the configuration information is a characteristic value which is a combination of configuration parameters selected from the group consisting of a setup upstream input level, a setup downstream output level for the lowest channel, a frequency differential, or a margin.

20. The method of claim 16 wherein the message is an Upstream Channel Descriptor message.

21. In a data-over-cable system, a method for improving ranging of a plurality of cable modems on an upstream channel, the upstream channel carrying data transmissions from the plurality of cable modems to a cable modem termination system at a head-end of a cable network, the method comprising the steps of:

ascertaining an implementation delta value on the cable modem termination system from difference values provided by the plurality of cable modems; and sending the implementation delta value in a message from the cable modem termination system to the plurality of cable modems, wherein the implementation delta value is combined with an initial transmit level for the cable modem during ranging to adjust the initial transmit level, whereby the cable modem begins ranging at the adjusted initial transmit level and is recognized by the cable modem termination system with fewer attempts than if the cable modem began ranging at a minimum specified transmit level.

22. A computer readable medium having stored therein instructions for causing a central processing unit to execute the method of claim 21.

23. The method of claim 21 wherein the ascertaining step comprises the steps of:

receiving the difference values on the cable modem termination system from Management Information Bases in the plurality of cable modems; and calculating the implementation delta value from the difference values.

24. The method of claim 23 wherein the calculating step comprises the steps of:

searching through the difference values to find a maximum value; and setting the implementation delta value equal to the maximum value.

25. The method of claim 23 wherein the calculating step comprises the steps of:
- averaging the difference values to obtain an average difference value; and
- setting the implementation delta value equal to the average difference value.

26. The method of claim 21 wherein the message is an Upstream Channel Descriptor message.

27. The method of claim 21 wherein the message is a Bandwidth Allocation MAP message.

28. In a data-over-cable system, a method for estimating an initial transmit level for a cable modem to range on an upstream channel, the upstream channel carrying data transmissions from a plurality of cable modems to a cable modem termination system at a head-end of a cable network, the method comprising the steps of:
- receiving an Upstream Channel Descriptor message on the cable modem from the cable modem termination system, wherein the message contains a characteristic value associated with configuration parameters for the data-over-cable system;
- measuring a signal level of a downstream channel on the cable modem, wherein the downstream channel carries signals from the head-end to the plurality of cable modems;
- setting the initial transmit level to a difference between the characteristic value and the signal level of the downstream channel;
- receiving an implementation delta value on the cable modem in a Bandwidth Allocation MAP message from the cable modem termination system, wherein the implementation delta value represents a dynamical correction to the initial transmit level that is responsive to changes in the data-over-cable network; and
- adjusting the initial transmit level by adding the implementation delta value,
- whereby the cable modem begins ranging at the adjusted initial transmit level and is recognized by the cable modem termination system with fewer attempts than if the cable modem began ranging at a minimum specified transmit level.

29. A computer readable medium having stored therein instructions causing a central processing unit to execute the method of claim 28.

30. In a data-over-cable system, a method for improving ranging of a plurality of cable modems on an upstream channel, the upstream channel carrying data transmissions from the plurality of cable modems to a cable modem termination system at a head-end of a cable network, the method comprising the step of:
- sending a characteristic value in an Upstream Channel Descriptor message from the cable modem termination system to the plurality of cable modems, wherein the characteristic value is combined with a signal level for downstream transmissions as measured by a cable modem to provide an estimate for an initial transmit level for the cable modem during ranging;
- receiving difference values on the cable modem termination system from Management Information Bases in the plurality of cable modems;
- calculating an implementation delta value from the difference values; and
- sending the implementation delta value in a Bandwidth Allocation MAP message from the cable modem termination system to a cable modem, wherein the implementation delta value is combined with an initial transmit level for the cable modem during ranging to adjust the initial transmit level,
- whereby the cable modem begins ranging at the adjusted initial transmit level and is recognized by the cable modem termination system with fewer attempts than if the cable modem began ranging at a minimum specified transmit level.

31. A computer readable medium having stored therein instructions causing a central processing unit to execute the method of claim 30.

32. The method of claim 30 wherein the calculating step comprises:
- averaging the difference values to obtain an average value; and
- setting the implementation value equal to the average value.

* * * * *